Dec. 10, 1957 C. R. ROCHE 2,815,684
AUTOMATIC TRANSMISSION
Filed Oct. 16, 1950 6 Sheets-Sheet 1

INVENTOR.
Clifton R. Roche.
BY
Harness, Dickey & Pierce
ATTORNEYS.

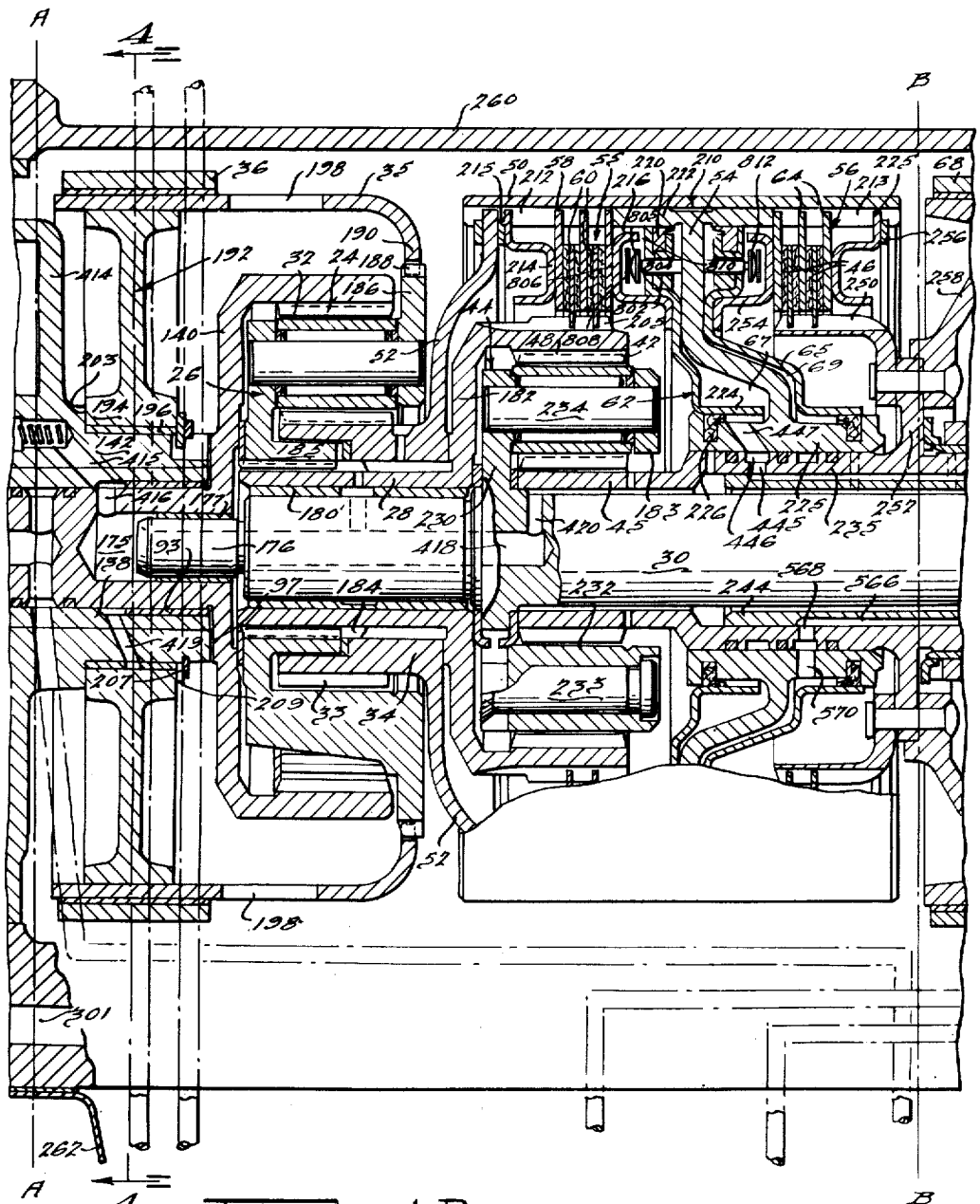

INVENTOR.
Clifton R. Roche.
BY
Harness, Dickey & Pierce
ATTORNEYS.

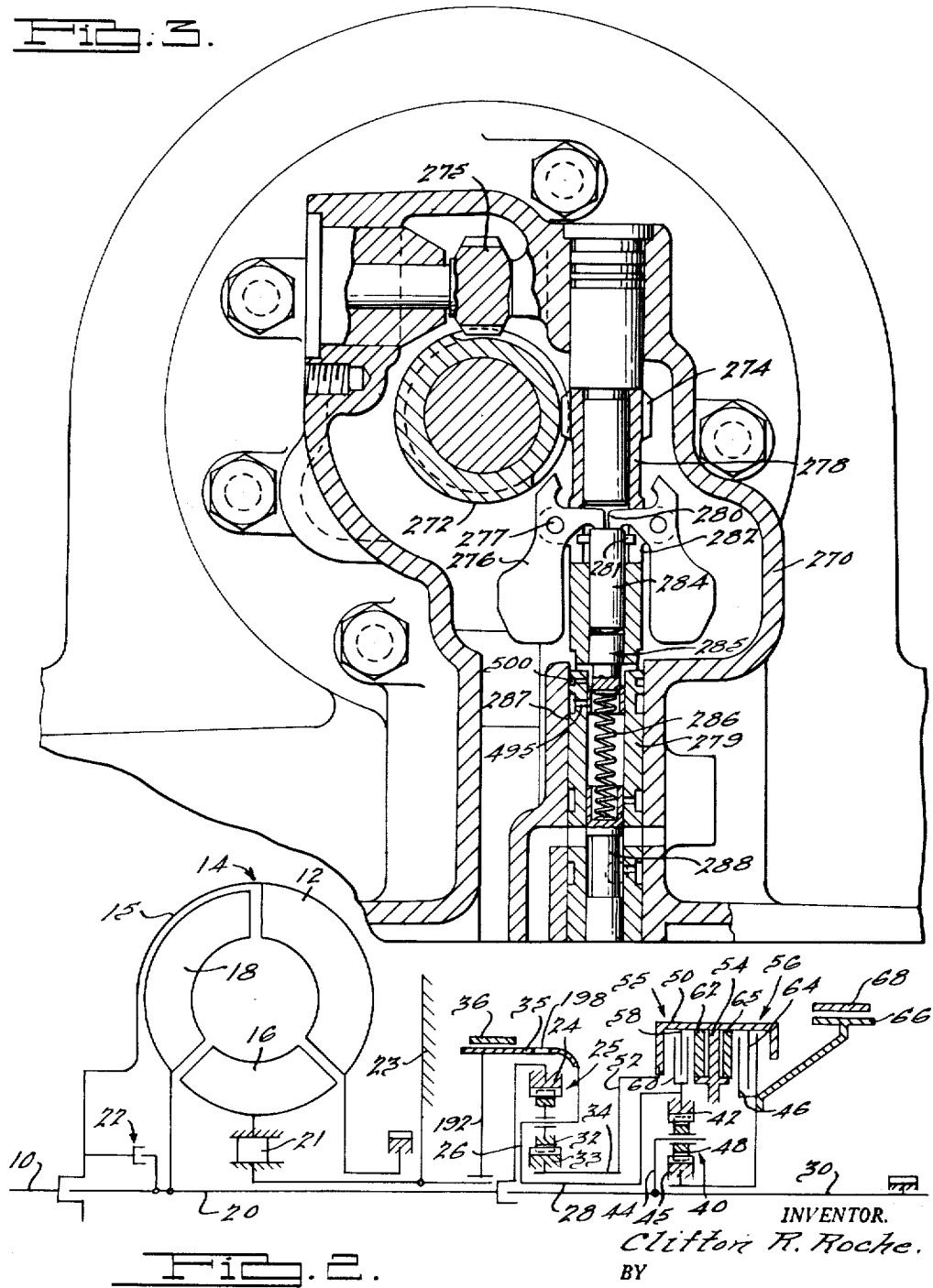

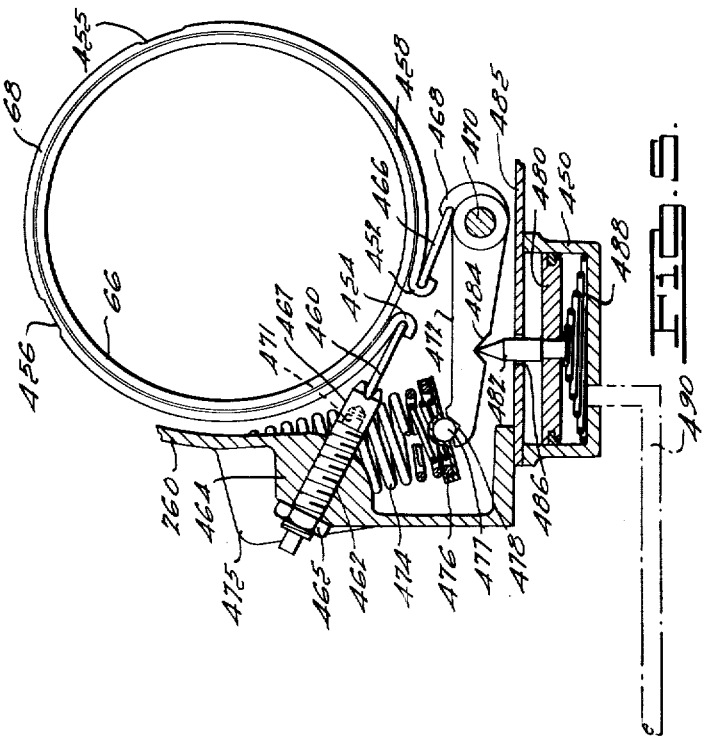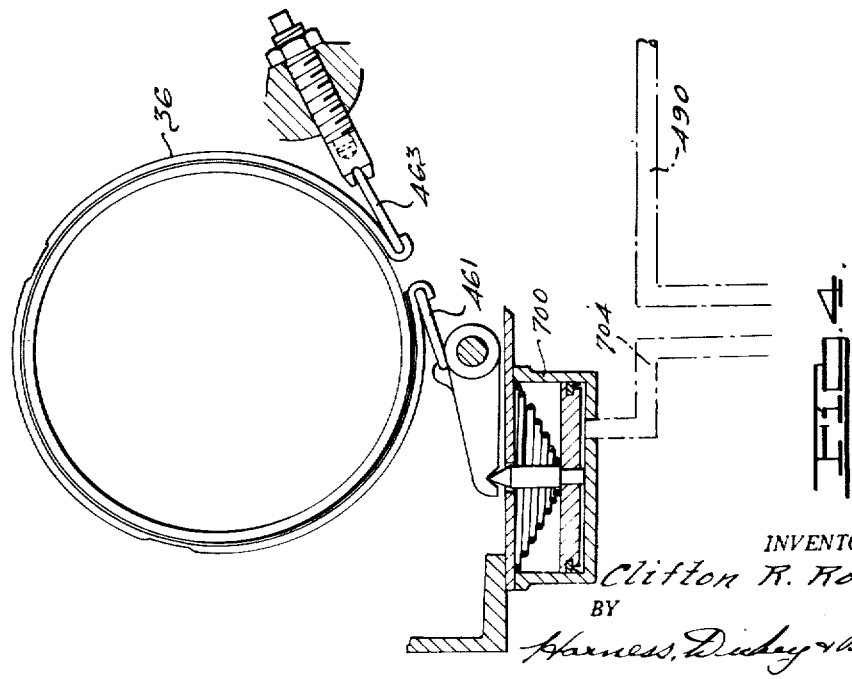

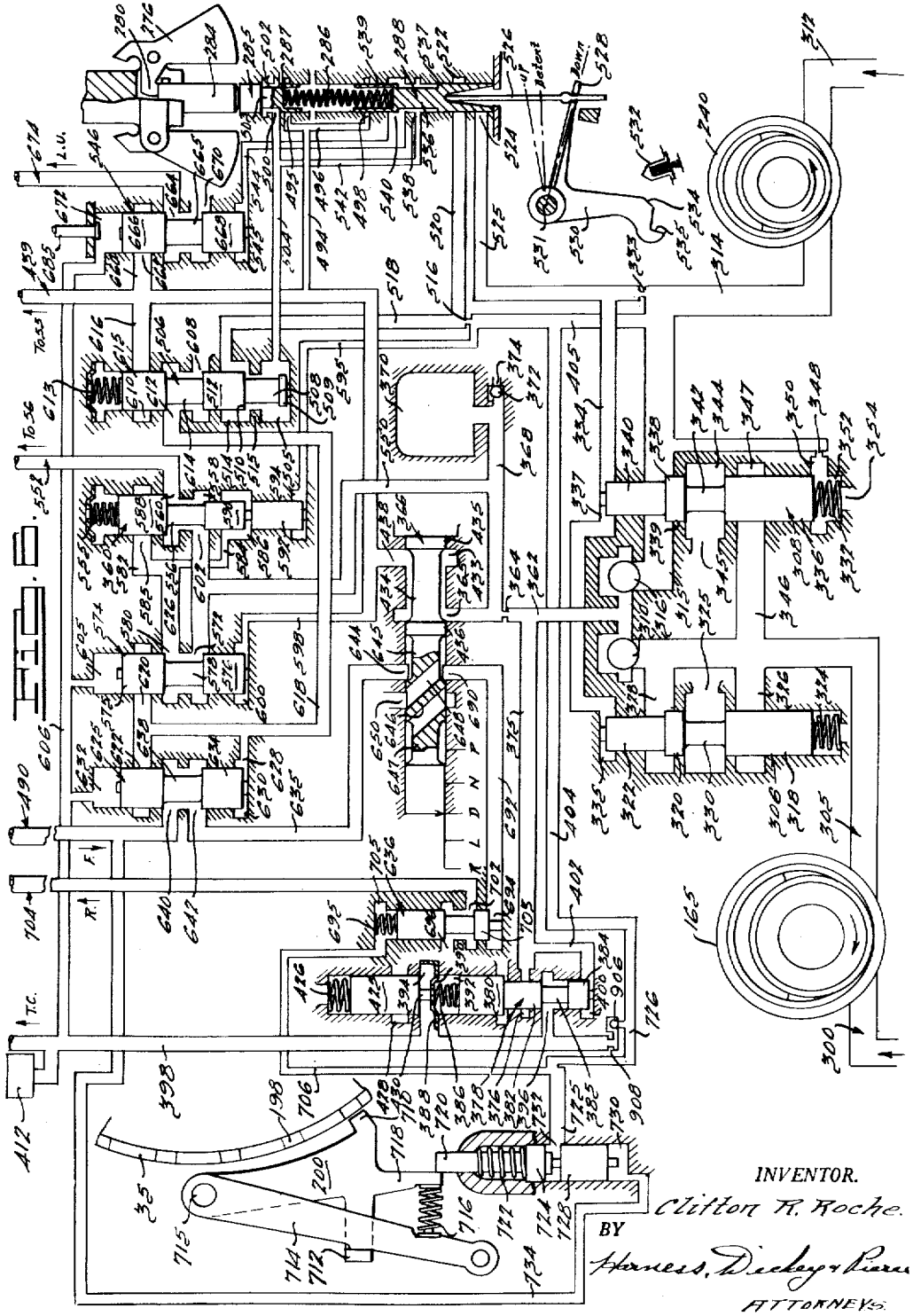

United States Patent Office 2,815,684
Patented Dec. 10, 1957

2,815,684

AUTOMATIC TRANSMISSION

Clifton R. Roche, Los Angeles, Calif.

Application October 16, 1950, Serial No. 190,384

37 Claims. (Cl. 74—645)

The present invention relates to automatic transmissions, particularly for automotive vehicles.

My objects in the development of the present invention may be summarized as comprising the provision of an automatic transmission having high performance characteristics, but which is less expensive to construct, more compact, and easier to service than other comparable transmissions of which I am aware.

Among more specific objects of this invention are to provide an improved hydraulic torque converter having novel and improved cooling means, and improved lock-out clutch mechanism for the hydraulic torque converter, including a novel blocker synchronizer arrangement; improved transmission mechanism incorporating a hydraulic torque converter and two geared ratios, designed in such manner that either one or two geared starting ratios may be employed (to supplement the increased torque derivable from the hydraulic torque converter); and novel and improved means preventing the frequent shifting into and out of the geared starting ratio (or ratios) during low speed driving in traffic or the like, where the speed of the vehicle is varied frequently, and often quite abruptly, but primarily at low speeds; the elimination of such unpleasant frequent automatic shifting rendering the operation of the vehicle at such low speeds smoother as well as more economical.

A further object is to provide an improved structural arrangement for transferring to rigid stationary portions of the casing the forces and reactions applied to brake bands and brake drums employed to regulate the action of the geared drives. Still another object is to provide novel, compactly interfitted means for mounting certain of the clutches and gearing to reduce the over-all dimensions and cost of the assembly. Another object is a novel improved parking lock arranged to rigidly hold the car against rolling. Another object is to provide means for preventing dangerously high rotative speeds of any of the operating parts in event the engine is raced with the parking lock applied. Another object is to provide an improved brake construction including improved brake band constructions.

Other objects pertain to the provision of an improved hydraulic controlling system for such a transmission, which controlling system includes means for automatically varying the effective fluid pressure in the operative portions of the control system in conformity with the torque demand upon the transmission mechanism. This eliminates loss of efficiency due to the expenditure of engine output in the maintenance of unnecessarily high pressures when not required.

Another object is to provide is a controlling system for a transmission of the indicated character, which incorporates a lock-out clutch for the hydraulic torque converter, novel means providing a high speed kickdown from the high speed drive to a geared drive without releasing the torque converter lock-out clutch. This eliminates the lag which occurs upon kickdown in the operation of some transmissions due to the sudden increase of slip in the torque converter when a geared drive is suddenly thrown into the line of drive.

Another important object is the provision of improved means for timing the disengagement of clutches and brake bands which are to be released upon the engagement of others which are called upon to take up the transmission of torque.

Still another object is to provide an improved fluid supplying means including two fluid supply pumps, one operated by a driving element of the transmission and another by a driven element of the transmission, and novel means whereby the fluid is at certain times supplied by one of said pumps, and at other times by the other pump.

A further object is the provision of an improved and simplified anticreep system.

The foregoing and other objects which will become apparent upon consideration of the present disclosure in its entirety are achieved in a transmission construction which incorporates a hydraulic torque converter, two fluid pumps and planetary gearing, the general arrangement of the planetary gear train and the manner in which the geared driving ratios are secured being similar to an arrangement disclosed in my copending application Serial No. 748,382, filed May 16, 1947, but the use of overrunning clutches to allow the effective release of one ratio when another picks up the drive being dispensed with, and in lieu thereof novel timed operating means and two-way acting clutches being provided. Automatic free-wheeling is thereby eliminated entirely from the mechanical action of the transmission, the release and engagement of the driving ratios being entirely regulated by the hydraulic control system.

In the drawings:

Fig. 1B is a similar view of the central or mid portion of the transmission;

Fig. 2 is a diagrammatic view of the principal mechanical components of the transmission;

Fig. 3 is a cross section taken substantially on the line 3—3 of Fig. 1C, and looking in the direction of the arrows;

Fig. 4 is a partly diagramatic cross-sectional view of the braking mechanism for controlling the reverse drive, taken substantially on the line 4—4 of Fig. 1B;

Fig. 5 is a view similar to Fig. 4 of a braking mechanism forming a part of the means for controlling the forward geared speeds, taken substantially on the line 5—5 of Fig. 1C;

Fig. 6 is a diagrammatic view of the principal hydraulic components, and certain related mechanical components, of the control system.

Figure 1A:
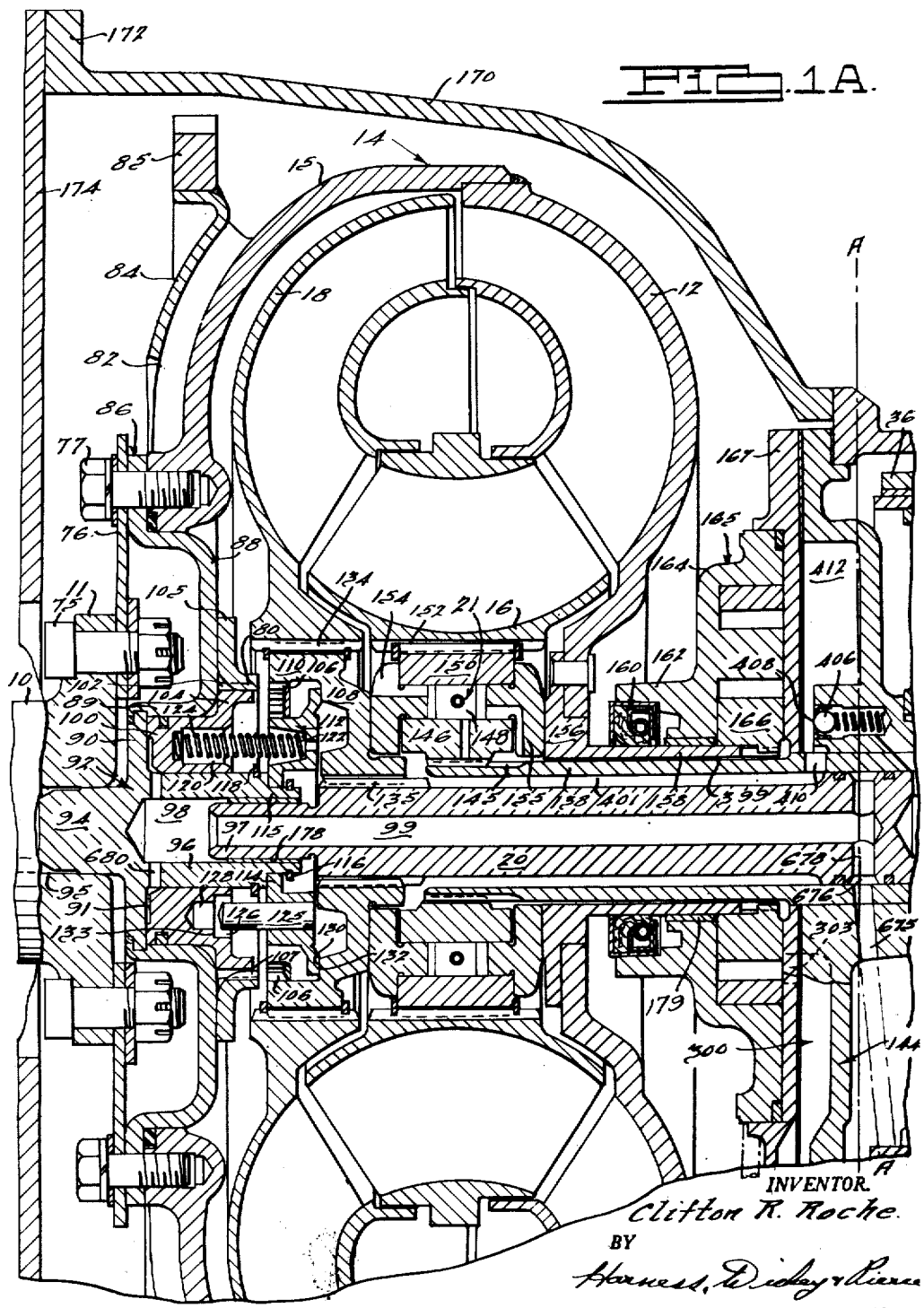
Figure 1A is a view in substantially diametric vertical longitudinal section, partly broken away, of the forward portion of an improved transmission incorporating my invention, including certain diagrammatic showings of control components.
Figure 1C:
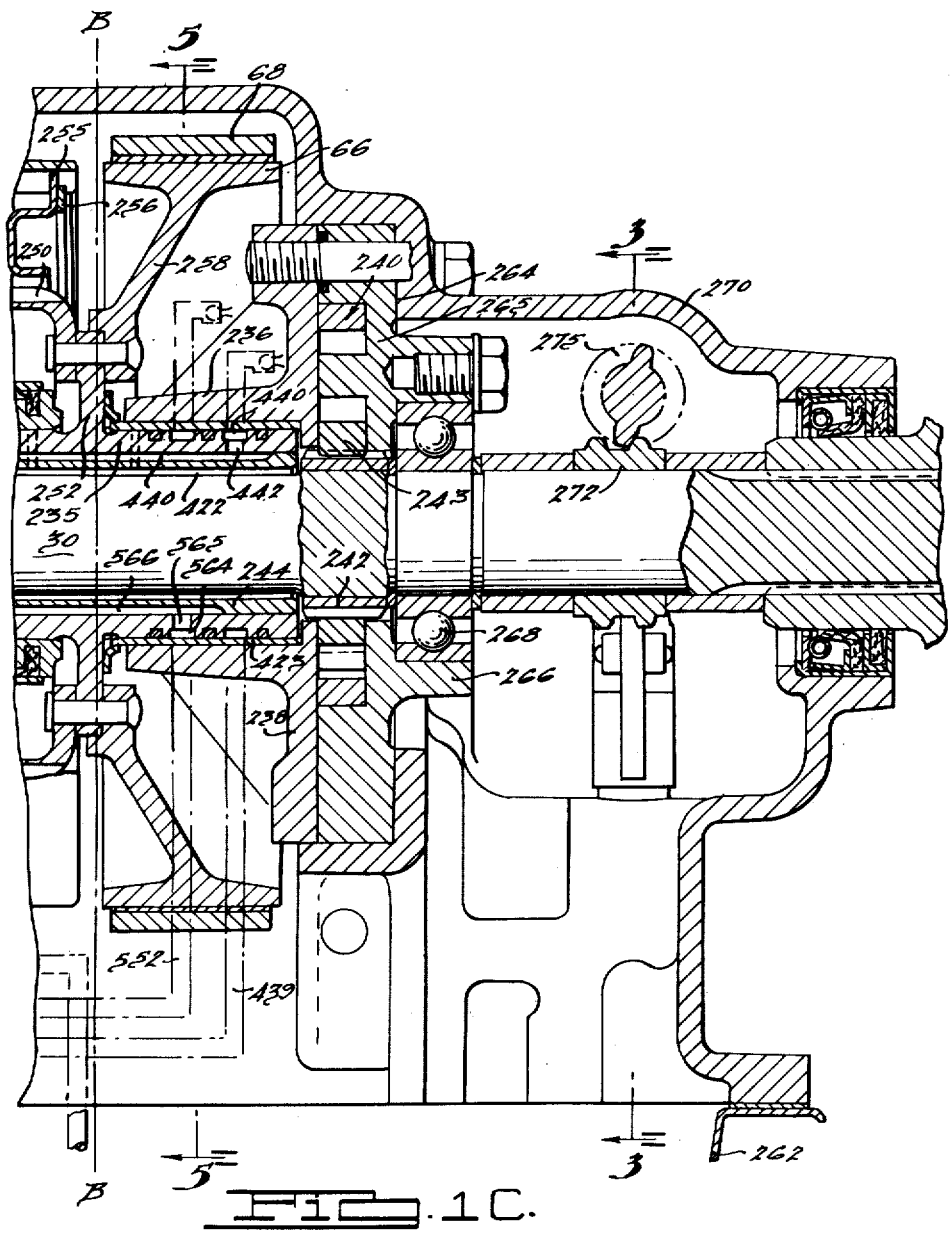
Fig. 1C is a similar view of the rear portion of the transmission.

Figures 1A, 1B, 1C, 4, 5 and 6 all contain diagrammatic representations of fluid passages. Figures 1A, 1B and 1C can be arranged in aligned relation from left to right in the order named and with the similarly designated vertical broken lines A—A and B—B in registry with one another, to afford a complete sectional drawing of my preferred transmission, and Fig. 6 can be placed below such assembled figures, and Figs. 4 and 5 can be placed above such assembled Figures 1A, 1B and 1C, with the similarly designated fluid passages of the several views positioned to form continuations of one another, to afford a complete diagrammatic showing of the control system in conjunction with related mechanical features shown in Figures 1A, 1B and 1C.

General arrangement of principal mechanical components

Referring first to the diagrammatic representation of the mechanical components depicted in Fig. 2, an outline description will first be given of the general arrangement and operation of the principal mechanical features.

The driving shaft of the transmission is indicated at 10, and may comprise the crankshaft of the engine (a vehicular installation being presumed, as previously indicated). The crankshaft drives the pump member 12 of a hydraulic torque converter which is generally designated 14. The pump member 12 is at the rear, and is connected to the driving shaft by the casing portion 15, as is common practice. The torque converter is indicated as provided with a single reactor portion 16 and a single turbine portion 18. The reactor is connected through an overrunning brake 21 to a stationary portion 23 of the casing. The turbine member 18 is rigidly attached to a transmission shaft 20, the forward end of which is piloted in the driving shaft. A positive toothed type of lock-out clutch 22 is provided for the members 15 and 18 of the hydraulic torque converter.

At its rear end the transmission shaft 20 is rigidly connected to the internal toothed ring gear 24 of a front planetary gearset which is generally designated 25. The output shaft 30 of the transmission, which may be directly coupled to the propeller shaft of the vehicle, is piloted at its forward end in the rear end of the transmission shaft. The three shafts 10, 20 and 30 are axially aligned. The carrier 26 of the front planetary gearset is secured to a hollow shaft 28 journaled on the forward end of the output shaft 30. The front planet gears 32 mesh with a sun gear 33 fast upon another hollow shaft portion 34 which surrounds the shaft 28. Attached to rotate with the carrier 26 and extending radially outwardly behind the front planetary gearset 25, and thence forwardly around the outside of such gearset, is a brake drum 35. A brake band 36 is engageable with such drum to control the operation of the reverse gear drive. The brake drum 35 may also be supported by a hub portion 192 at its forward end journaled on a fixed casing portion, as will presently be brought out in greater detail.

A second or rear planetary gearset is provided, generally designated 40, and which includes an internal toothed ring gear 42, to which the hollow shaft 28 is rigidly connected, a carrier 44 which is rigidly connected to the output shaft 30, and a sun gear 45 which is fast with respect to a set of clutch plates 46.

A hollow drum 50 spacedly surrounds the rear gearset and contains two friction disk-type hydraulically operable clutches. The drum 50 is rigidly attached to the hollow shaft 34 by a web 52 and is provided with a central partitioning web 54, forwardly of which is a disk clutch generally designated 55, while to the rear of the partition is another disk clutch assembly generally designated 56. Clutch 55 includes plate means as 58 keyed to drum 50 and adapted to coact with friction disks as 60 which are fast with respect to the internal toothed gear 42. This clutch is adapted to be engaged and released by piston means 62. In the clutch 56 are plate means as 64 keyed to drum 50 and adapted to coact with the plates 46, engagement and release of this clutch being effected by means of a piston 65. Rigidly secured with respect to clutch plates 46 and rear sun gear 45 is a brake drum portion 66. A brake band 68 is engageable with the drum 66 to control the operation of the forward geared drives of the transmission.

The periphery of the drum 35 is also provided with a series of apertures 198 with which a holding dog 200 is engageable to form a parking lock, which will presently be more fully described.

Operation of principal mechanical components

A low speed geared-hydraulic forward drive is securable by engaging the brake band 68 and the clutch 56 and leaving the other clutches and brakes released. This will be seen to hold both sun gears 33 and 45 stationary. When the engine is speeded up sufficiently to transmit enough torque to move the vehicle, the turbine member 18 turns the ring gear 24 forwardly, rolling the planet gears 32 on the sun gear 33 and thereby turning the rear internal gear 42 forwardly, the rear planet gears being rolled upon the sun gear 45 and turning the carrier 44 and output shaft 30.

An intermediate speed geared-hydraulic drive is obtained by engaging only the clutch 55 and band 68. Clutch 55 then locks up the front gearset, since the carrier 26 and sun gear 33 are prevented from rotating with relation to one another. The rear sun gear 45 is held by the band 68, and reduction is afforded only by the rear gearset.

A direct drive through the gearing is achieved by disengaging the band 68 and engaging only the clutches 55 and 56, which locks up both gearsets, so that they turn as a unit with the transmission shaft 20. Preferably also the clutch 22 is engaged to lock-out the hydraulic torque converter.

Reverse drive through the gearing is obtained by engaging only the brake band 36 and clutch 56. Under such conditions, the front carrier 26 and rear ring gear 42 are held stationary. Rotation of the front planet gears 32 by the front ring gear 24 turns the front sun gear 33 backwardly. The drive is transmitted from the front sun gear through shaft 34, web 52, drum 50 and clutch 56 to rear sun gear 45 which rolls the rear planet gears 48 rearwardly on the internal gear 42, carrying the carrier 44 and propeller shaft 30 rearwardly at reduced speed.

Engagement of clutch 22 locks out the hydaulic torque converter, and I preferably engage this clutch when driving at ordinary road speeds, and also maintain engagement of this clutch when the transmission is shifted down to the intermediate ratio at relatively high speeds by the kickdown shift means, as will presently appear in connection with the discussion of the control aspects of the transmission.

In neutral, with the engine running, clutch 56 is engaged and the other clutches and brakes are disengaged. By reason of the engagement of the clutch 56 when the transmission is in neutral, the danger of damaging the bearings of the front planet gears in event the engine is raced with the transmission in neutral is eliminated. If the clutch 56 were not engaged, and the engine were raced in neutral, and if the friction in the rear planetary gearset should be higher than in the front set, so that all of the rotation took place in the front gearset, the front planet gears might be spun at very high speeds and damage to the front planet gear bearings could result. By reason of the engagement of the clutch 56, however, the rotation of the engine with the transmission in neutral tends to turn the rear sun gear 45 rearwardly and the rear internal toothed gear 42 forwardly. The rear planet gears 48 turn on their spindles, since the rear carrier is held stationary by the rear wheels of the vehicle. Both planetary gearsets are thus in rotation and the speed of the planet gears and the sun gear of the front set are lower than they would be if the clutch 56 were not engaged and the friction in the rear set should exceed that in the front set.

In the park position, as noted previously, the drum 35 is held by a latch 200 (Fig. 6) engaging in one of a series of holes 198 in the drum. At such time brake band 68 is also engaged, clutch 55 is disengaged. The car then cannot move because the sun gear 45 of the rear planet set is held by band 68 and the ring gear 42 of the rear planet set is held by the latch, so that the carrier 44 and driven shaft 30 are held immovable. If the engine is operated under such conditions, clutch 56 also engages, so that front sun gear 33 is also held, locking up the front planet set as well, and requiring slip to take place in the hydraulic torque converter.

The following table shows the conditions obtaining in the principal clutching and braking devices in the several drives and settings of the control components:

|         | Brake 36       | Clutch 55   | Clutch 56   | Brake 68    |
|---------|----------------|-------------|-------------|-------------|
| Low     | Disengaged     | Disengaged  | Engaged     | Engaged.    |
| Second  | ----do         | Engaged     | Disengaged  | Do.         |
| Direct  | ----do         | ----do      | Engaged     | Disengaged. |
| Reverse | Engaged        | Disengaged  | ----do      | Do.         |
| Neutral | Disengaged     | ----do      | ----do      | Do.         |
| Park    | Drum latched   | ----do      | ----do [1]  | Engaged.    |

[1] When engine is running.

Structural features of the hydraulic torque converter and lock-out clutch assembly The hydraulic torque converter may be fastened to the crankshaft of an engine, in which event the driving shaft 10 may be the crankshaft of the engine. A flange portion 11 formed on the rear end of the driving shaft 10 is secured by bolts 75 to a relatively thin sheet metal web 76 which is secured by screws 77 to the rotary casing portion 15 of the hydraulic torque converter. Casing 15 is in turn secured at its rear end to the pump member 12 of the torque converter. The driving casing portion 15 is cast with integral cooling fins 82 to which a sheet metal shroud ring 84 is secured. Shroud ring 84 carries the starting flywheel ring gear 85. Also secured to the front face of the member 15 by the screws 77 beneath the web 76 is a somewhat heavier sheet metal web 86 having a rearwardly offset annular portion 88 covering the inner ends of the bolts 75. At its inner periphery, the offset web portion 88 carries a forwardly extending cylindrical flange portion 89 which is fast with respect to a radial flange 90 formed upon a combined pilot bushing and fluid conducting member, generally designated 92. Member 92 has a piloted stem portion 94 extending into and rotatably supported in an axial pilot opening 95 in the end of the crankshaft 10, and is provided also with a rearwardly extending concentric cylindrical wall 96 defining a cylindrical central opening 98 which communicates with a drilled hole 99 extending axially rearwardly from the front end of the transmission shaft 20 to a point near but spaced from the rear end of such shaft.

The space between the cylindrical walls 89, 96 defines a concentric annular chamber within which an annular piston 100 is slidable. Piston 100 carries spline-like clutch teeth 102 formed upon the periphery of a flange 104 integral with the piston and extending outwardly directly behind the rearwardly offset wall 88 of the web member 86. Spline portions 102 slidably interengage coacting spline portions 80 carried by an annular bracket 105 secured to the rear face of the offset portion 88. The piston 100 is movable rearwardly far enough so that the peripheral teeth 102 may also engage coacting clutch teeth 106 spaced and positioned correspondingly to the teeth 80 formed upon the inner periphery of the ring 105, the teeth 106 being formed upon a hub 108 fast upon the forward end of propeller shaft 20.

The turbine member 18 of the hydraulic torque converter is keyed to the periphery of the hub 108. The toothed portion 102 of the piston 100 is long enough to bridge the spline portions 80—106, to clutch the crankshaft to the turbine member 18, and thus eliminate the hydraulic torque converter from the line of drive.

An annular chamber to the rear of the piston 100 is defined by the rearwardly overhanging flange 104 of the piston 100 and the forwardly overhanging flange 110 of the hub 108. Within such chamber is a blocker synchronizer ring 112 having a hub portion 114 slidable upon a cylindrical reduced rear extremity 115 of the wall 96 of member 92. The limit of rearward travel of the blocker synchronizer ring is defined by a snap ring abutment 116, while the rearward limit of travel of the piston is defined by a snap ring abutment 118. The opposed faces of the piston 100 and ring 112 are provided with a series of correspondingly spaced sockets 120, 122 adapted to accommodate coil compression springs 124. Alternated with the spring sockets 122 and projecting forwardly from the ring 112 are a plurality of blocker pins 125 which extend forwardly far enough to engage, and always project into, coacting blocker pin sockets formed in the rearwardly directed face of the piston 100. The sockets in the piston are of stepped configuration, each such socket having a cylindrical mouth portion 126 of substantially greater diameter than the pin 125. Enlarged portions 126 are deep enough so that when the piston is fully drawn forwardly into the annular chamber between the walls 89, 96, the front ends of the pins 125 extend only into the enlarged portions 126 of such sockets. Each such socket also includes a deeper concentric portion 128 of a diameter to slidably fit over the end of the corresponding pin when the piston is moved to the rear. The clearance between the engaged socket portions 126 and the pins 125 determines the amount of angular rotation or clocking permitted between the piston and the blocker ring. It will be noted that the blocker ring is also formed with a flat back face 130 which is yieldably urged against a flat front face 132 formed upon the hub 108. Due to this frictional engagement, which is imposed by the springs 124, the blocker ring tends to rotate with the hub 108 and turbine 18, and whenever the pump and turbine are rotating at different speeds, the drag between the surfaces 130, 132 holds the blocker ring turned with relation to the piston 100, so that the pins 125 partially overlap the shoulder 133 which joins the reduced socket portion 128 to the enlarged mouth portion 126 of each socket. Each shoulder 133 is thus blocked by the pin 125, and the piston is thereby held against moving to the rear, so that its toothed clutch portion 102 cannot bridge the toothed portions 80, 106. It will be apparent that upon synchronizing of the parts 12, 18, however, or a torque reversal, if pressure is present in the chamber space 91 at the head of the piston, the piston can move rearwardly to lock the torque converter by bridging the clutch portions 80, 106.

It will be observed that the right side of piston 100 is exposed to the pressure in the hydraulic torque converter assembly, but such pressure is lower than the fluid pressure delivered to the cylinder 91 from the supply and control system (to be described) when the lock-out clutch is to be engaged. When the pressure in cylinder 91 is relieved, the converter pressure acts on the right side of piston 100 to disengage the clutch.

The hub 108 is splined to the turbine 18 at 134 and is splined at 135 to the forward end of the transmission shaft 20.

Surrounding the transmission shaft 20 and extending rearwardly from a position approximately beneath the center plane of the hydraulic torque converter is a fixed sleeve 138, which at its rear end terminates adjacent the flange 140 which connects the internal gear 24 to the shaft 20. Sleeve 138 is secured in a fixed bearing supporting flange 142 carried by a partitioning web 144 forming a part of the casing structure. The forward end of the sleeve 138 is splined as indicated at 145, and secured thereto is the inner race or hub portion 146 of the overrunning brake assembly 21 for the stator 16 of the hydraulic torque converter. Other elements of the overrunning brake, which may be of conventional sprag-type, include sprags 148 and a ring 150 which is splined at 152 to the inner periphery of the stator. The stator and overrunning brake are also located by side thrust plates 154, 155 which also position the sprags 148.

The impeller or pump member 12 of the torque converter is secured at its inner periphery to a flange 156 formed upon the front end of a hollow shaft 158, journaled in a bearing 179 in the front casing section 164 of a hydraulic pump shown as of the gear-type and generally designated 165. Pump casing section 164 is rigidly secured to and forms in effect a part of the partition 144, A plate 167 between casing section 164 and partition 144 forms the rear wall of the casing of pump 165. Hollow shaft 158 extends into the interior of the pump casing, where it carries the pump driving gear 166. An oil seal 160 is located between hollow shaft 158 and collar flange portion 162 of pump casing portion 164.

The fixed housing for the hydraulic torque converter includes a belled casing portion 170 flanged at 172 for securance to a plate 174 mounted on the engine. Plate 174 is provided with a suitable air inlet (not shown) and the shrouded blades 82 act like a centrifugal fan drawing air in through the inlet in the plate 174 and forcing it out through suitable openings (not shown) in the fixed casing structure 170 for the hydraulic torque converter.

When the complete transmission assembly, including the hydraulic torque converter, is removed from the car, all parts of the torque converter assembly can be disassembled and removed from the front after the plate 86 is removed.

At its rear end, the casing portion 170 is flanged for attachment to the casing 260 for the gearing.

*Structural features of the mechanical torque converting components*

A pilot bearing opening 175 is formed in the rear end of the shaft 20, which projects through partition 144 into the interior of the casing 260, and receives the piloted front end portion 176 of the output shaft 30. A bushing 177 is shown as interposed between the pilot bearing portions 175, 176, and bushings may also be provided as shown at 178 between the front piloted portion 97 of the transmission shaft and the wall 96 of the member 92. The rear end of the transmission shaft 20 is journaled in a bearing bushing 93 mounted in the rear end of the hollow shaft 138. Journaled on the output shaft 30 behind and close to the flange 140, as by means of a bushing 189, is the hollow shaft 28 previously mentioned which is formed with an integral flange 182 which carries the internal gear 42 of the rear planetary gearset. The forward end of the hollow shaft portion 28 is splined as indicated at 184 to receive the internally splined hub portion 185 of the carrier 26 for the front planet gears 32. A rear side flange 186 of the carrier extends outwardly beyond the internal gear 24 and is provided with peripheral splined teeth 188 which are interfitted with corresponding splined teeth formed upon the inturned rear flange portion 190 of the drum 35. The drum 35 extends forwardly to a position close to the partition 144. Such forwardly projecting portion of the drum carries a radially inwardly projecting disklike hub 192 which may be welded to the interior of the drum. The hub 192 is journaled as by means of a bushing 196 upon the fixed hub 142 carried by the casing partition 144. The brake band 36 is engageable with the surface of the drum in alignment with the hub 192.

The widened inner peripheral portion 194 of the hub member 192 is accurately confined between a shoulder surface 203 formed upon a rear face of the partition 144 at the forward end of the stationary hub portion 142, and a retainer ring 207 and bearing washer 209 secured in position at the rear end of a stationary hub portion 142. The drum 35 is thus accurately held against axial movement. Axial movement can occur between the rear flange 186 of the front carrier 26 and the rear flange 190 of the drum 35 by virtue of the splined connection 188 and the clearance gap 97 which permits end play in the gearing and longitudinal movement which is necessary for expansion and contraction of the gearing and related parts as a result of heating and cooling. If the gears have helical teeth, strong axial reaction forces are transmitted to the drum when the brake band 36 is applied despite the splined connection 188, because of the fact that when the torque transferred between flange portions 186, 190 is high, the friction at the splines 188 is so great as to tend to prevent relative axial movement between the flanges 186, 190. Due to the rigid locating of the drum through its attached front hub 192, however, such axial forces are transmitted through the stationary hub 142 and partition 144 to the casing structure and cannot cause misalignment of the brake band. Without this provision, the longitudinal forces would tend to misalign the brake band 32 in relation to the band struts 461, 463 and would therefore apply the load from the struts off-center, toward the edges of the band, which would decrease the wrapping quality of the band and thus decrease the effectiveness of the brake. Further details of the braking means will be described hereinafter.

The hollow shaft portion 34 previously mentioned is formed as an integral hub portion of the front sun gear 33 and surrounds the hollow shaft 28, and a web flange 52 is also integral with such hub portion. The outer periphery of flange 52 is locked to the drum 50. The drum 50 is enough larger than the rear internal gear 42 to accommodate clutch assembly 55 therebetween. The outer periphery of the internal gear 42 is provided with longitudinal splines 205, serving as keying means for clutch disks 60 which rotate with the gear, while alternatedly interfitted disks 58 are keyed to the inner periphery of the drum 50. The drum proper is formed of two metal cylindrical rings welded together in end-to-end relation as indicated at 210, such peripheral weld being in transverse alignment with the central partition 54. The drum structure is also stiffened by internal longitudinal ribs 212 which form the keying means for the plates 58. The clutch disks are arranged to be gripped between a sheet metal backing plate 214 which is positioned against outward (forward) movement by one of the locking rings as 215 which serves to position the web flange 52, and a pressure plate portion 216 which is also formed of sheet metal and is located on the forward side of the sheet metal piston 62. The piston carries at its outer periphery a sealing ring 220 which wipingly engages the cylindrical interior of a flange portion 222 shown as integral with the partition 54. At its inner periphery, the piston is provided with an integral cylindrical flange 224, which is slidable upon a hub portion 225 integral with the partition 54 and sealed with respect thereto by a flexible sealing member 226 carried by the hub portion 225.

It should be noted that although the clutch 55 functions to lock-up the front gearset, it is mounted directly upon and surrounds the ring gear 42 of the rear gearset. Although the radial diameter of this clutch is less than it would be if it were mounted between the gearsets or besides one of the gearsets, its dimensions are adequate because of the fact that it is not required to hold the full input torque. By connecting one set of clutch plates (58) to the front sun gear by means of the web 52, and the other set of plates (60) to the front carrier 26 by means of the web 182 which also functions to carry the ring gear 42, the torque applied to the clutch plates is considerably reduced as compared with the torque which would have to be held if the lock-up clutch were connected to the front ring gear. This permits reducing the proportions of the clutch in the indicated manner, and interfitting it with the gearing, thereby reducing the overall length, weight and cost of the transmission.

On the rear side of the partition 54 and also coacting therewith is another sheet metal piston 65 which serves to actuate the clutch 56. Clutch 56 is constructed in a manner generally similar to the clutch 55. The clutch plates 64 are keyed to rib portions 213 of the drum which correspond to the forwardly projecting rib portions 212, while interfitted disks 46 are keyed to a supporting flange 250 attached to a flange 252 formed integrally with the sleeve 235. The disks are adapted to be gripped between a pressure plate 254 located on the rear face of piston 65 and a reaction plate 225 held within the rear end of the drum 50 by a locking ring 256.

The front flange of the carrier 44 for the rear planetary gears is formed as an integral extension of the shaft 30, as indicated at 230. The rear web 183 of the carrier is secured to the front web by integral bosses 232 and headed pins 233 and also by the planet shafts 234 upon which the planet gears 48 are mounted. The sun gear 45 of the rear set is shown as formed integrally upon a sleeve portion 235 which also serves as a part of a manifolding structure for distribution of hydraulic actuating fluid, as will presently be described. Sleeve portion 235 is journaled in a bearing collar 236 formed integrally with a partition 238 which constitutes a part of a housing for a rear pump assembly generally designated 240, drivable by the shaft 30 through the agency of a driving sleeve 242 rotatably secured to the shaft. Pump gear 243 is splined to sleeve 242. The internal diameter of the sleeve 235 is substantially greater than the external diameter of the shaft 30, and another sleeve 244 is tightly fitted into the interior of the sleeve 235 and coacts therewith in conducting the fluid to the clutching means in the drum 50, the sleeve 244 also being of larger internal diameter than the shaft 30, so that a clearance exists between these parts. There is also clearance between the shaft 30 and the gear portion 45 at the forward end of the sleeve 235, so that a certain amount of floating movement is afforded all of the parts mounted upon the sleeve 235.

Also fixedly attached to the flange 252 is an angular web portion 258 which is substantially of truncated conic form and extends angularly rearwardly to support the brake drum portion 66, which is integral therewith, in a position in transverse alignment with the bearing supporting hub portion 236. Although the load resulting from the application of the brake band 68 is transmitted through the bearing means 423, serving to journal the rear sun gear 45 and the manifold structure 235, 244 in the rear fixed hub 236, such sun gear and manifold portions are not rotating when the brake is applied, and no load is applied to the gear train at such time, the brake drum 66 being offset rearwardly to lie directly over the bearing and hub portions 423, 236.

The casing structure which surrounds the gearing and clutch and brake portions last described may be of generally conventional construction, and is shown as a cast housing 260 having a removable bottom oil pan 262. To the rear of the pump 240, which may also be of the gear-type, the housing is reduced to define a locating shoulder portion 264 which positions the rear half 265 of the rear pump casing, and also positions the portion 238 previously described. An antifriction bearing for the rear end of the shaft 30 is located in a bearing flange 266 formed integrally with the pump casing portion 265. The bearing assembly is generally designated 268.

Rearwardly of the pump, the housing is provided with a reduced portion 270 which houses driving gears 272, 274 for the governor means, and also houses the governor structure. A speedometer driving gear 275 may also mesh with the gear 272 within the rear casing portion 270.

Referring to Fig. 3, it will be seen that the governor incorporates a pair of flyweights 276 pivoted upon horizontal pins as 277 carried by a hollow governor shaft 278. The gear 274 is formed upon the upper end of the governor shaft. Each flyweight has an integral finger portion 280 projecting through a slot 282 in the wall of the hollow shaft 278 and into over-engaging relation with a plunger 284 extending into the hollow shaft. Plunger 284 bears downwardly against the top of a valve member 285 which is slidable in a sleeve or governor valve housing 279, pressed into a hole 287 in the housing 270, and which is urged upwardly against the finger portions 280 by a compression spring 286. There is no relative rotation between the plunger and the finger portions due to a pin 281, the ends of which project into slots 282 through which the finger portions project and therefore the finger portions and the plunger rotate together with the gear 274. The plunger is slidable and rotatable in the upper portion of sleeve 279. At its lower end, the spring bears downwardly against another valve element 288 slidable in the sleeve 279. The sleeve has suitable ports and passages and serves as a valve body for the valves 285, 288. The action of such valve components will be considered hereinafter.

Brake bands and brake details

The applying means for the forward speeds brake band 68, as best shown in Fig. 5, is arranged to apply the brake band at all times except when fluid is delivered to the actuating servo-motor cylinder 450. The brake band 68 may be formed from an integral length of sheet metal having formed hooked end portions or pockets 452, 454 at the applying end and the anchored end thereof, respectively. At a plurality of spaced points, as indicated at 455, 456, the band is provided with localized areas of reduced thickness extending the full width thereof, and which in effect constitute hinges, the areas between and on either side of which act as relatively rigid brake shoe sections. This band may be made of a one-piece stamping of heavy enough material to maintain its shape in processing and in applying the lining 458, which may be bonded thereto. With this arrangement, the band can be made perfectly round. The sections at the ends remain heavy where the loads are applied, and all three of the shoe sections being heavy. These sections are lowly stressed. The reduced sections 455, 456 are highly stressed, so that all of the bending when engaging or disengaging the band will occur at the reduced sections. The band is thus very flexible in its over-all nature, and yet even with hard usage maintains its shape and has perfect contact with the drum, and therefore excellent wrapping qualities. The anchored end hooked portion 454 of the band receives a strut 460, the other end of which is received in a thrust cap 467. The screw 462 is provided at its inner end with a reduced axial pilot portion 471 and the cap 467 is provided with an axial recess into which the pilot rotatably fits, so that the cap is retained upon the end of the screw, but the screw can be turned without rotating the cap. The adjusting screw permits the anchored end portion 454 of the brake band 68 to be fixed in any desired position. The strut is made in the form of a plate the ends of which are rounded to fit into the two pockets, one of which is formed by the hooked end 454 carried by the end of the band, and the other of which is in the form of a transverse slot in the end of cap 467. Thrust cap 467 is adjustably supported and backed up by the adjusting screw 462, which is mounted in a side of the transmission case 260 in a thickened portion 264, the screw being rotatable independently of the cap. A lock nut 465 is provided for the adjusting screw. The other end of the band is likewise pivotally connected to a strut 466, similar in construction to the strut 460, which is actuatable by an arm 468 pivoted upon a pin 470 fixedly supported in the transmission case. A longer and substantially horizontal lever arm 472 integral with the arm 468 is normally urged in a direction to cause the brake band to contract and engage the drum by means of a compression spring 474. The spring reacts at its upper end against a portion 475 of the transmission case, and at its lower end is seated in a retainer cup 476, which in turn holds a ball portion 477 which bears against a socketed portion 478 formed in the end of the arm 472. The cylinder 450 contains a piston 480 to which a stem 482 is attached, bearing upwardly against a socketed portion 484 formed in the bottom of the arm 472. As shown in Fig. 5, the cylinder 450 is secured to a bottom plate portion 485 which is mounted on the portion of the transmission casing below the actuating mechanism for the brake band, the stem 482 extending upwardly through a hole 486 in the plate 485. A relatively light spring 488 holds the piston and stem 482 up against the socketed bottom of the arm 472, but the spring 488 is weaker than the spring 474 and therefore cannot release the brake, which is held applied by spring 474 except when fluid under sufficient pressure is delivered to cylinder 450. The fluid passage leading to the cylinder 450 is designated 490.

The details of the brake band 36 for actuating the reverse brake, and its mounting and actuating means, shown in Fig. 4, are similar to those of the brake band 68, shown in Fig. 5, however the lever is arranged to engage the band by the force exerted by the piston contained in a cylinder 700. The fluid passage leading to the cylinder 700 is designated 704. Therefore, when fluid is delivered to the servomotor cylinder 700 the brake is applied and when the fluid is released from the cylinder the brake is released.

*Hydraulic control system: Fluid supply and pressure regulation*

The components of the fluid supply and control system are indicated in Fig. 6, principally in diagrammatic form, although some structural features are shown. Whenever the shape of a structural part in Fig. 6 differs from the shape indicated in the other figures, however, the other figures depict the actual construction and the change thereof in Fig. 6 is merely for simplification and added clarity of diagramming, as will be apparent. In Fig. 6, the intake to the front pump is indicated at 300. As indicated in Figs. 1A and 1B, such intake is actually formed by coacting passage defining portions in the partition 144, transmission case 260 and the pump housing. The lower terminus of such inlet passage is defined by an aperture 301 in the wall of a lower forward portion of the transmission case which is overlapped by the partition 144, the aperture 301 opening into the transmission case below the oil level therein. At its upper end, the inlet passage system to which the general designation 300 is applied terminates in an aperture 303 extending through the rear cover plate 167 of the front pump housing, the aperture 303 constituting the inlet of the front pump. The front pump outlet passage is generally designated 305 in Fig. 6 and leads to an assembly consisting of pressure regulating valves 306, 308, and a check valve 310 arranged to prevent backflow to the pump. The rear pump 240 has an inlet 312 which also communicates with the sump and an outlet passage 314 which communicates through a branch passage 315 with a check valve 316.

The valve 306 includes a bottom spool 318, a middle spool 320, and a top piston portion 322. A spring 324 urges the valve upwardly. When the valve is in its raised position in which it stands when neither pump is delivering pressure, a vent port 325 formed in the side of the body of this valve is sealed off by the spool portions 318, 320. At such time also, the bottom spool 318 seals off a branch conduit 326 communicating with the front pump outlet passage 305, and the spool and piston portions 320, 322 coact to seal off a second branch passage 328 which also communicates with the passage 305. When the front pump delivers pressure, which it does whenever the engine is in operation, the pressure bears downwardly upon the top of spool 320 tending to move the valve 306 downwardly. The valve then acts as a pressure regulating valve, since when the pressure rises above the desired maximum, it moves downwardly until the top edge of the spool 318 moves into the branch passage 326, and the neck portion 330 of the valve which is longer than the space between passage 326 and port 325 then connects the last-mentioned passage and port, and the valve allows a throttled escape of excess fluid and maintains a desired maximum pressure.

The valve 308 is urged upwardly by a spring 332 which is calibrated to maintain the rear pump output pressure slightly higher than the front pump output pressure. The valve 308 includes a bottom spool portion 336, a middle spool 338 and a top piston portion 340. A neck portion 342 joining the spool portions 336, 338 conforms to the width of a chamber 344 which communicates with a dump port 345, and the neck portion 342 is longer than the space between chamber 344 and a branch passage 346 which communicates with the front pump outlet 305. The upper face of spool portion 338 is exposed to the rear pump pressure obtaining in branch passage 315. When the valve 308 is moved downwardly by rear pump pressure, it dumps the front pump 165. This is accomplished by the spool 336 which moves downwardly into the port 347 under the influence of the rear pump pressure exerted on top of spool 338. Spool 338 is substantially shorter axially (in a vertical direction) than the chamber 344 to which the vent port 345 is connected, so that the spool 338 can move downwardly into the chamber 344, and can then coact with a throat portion 339 of the valve body between chamber 344 and passage 315, to throttle the rear pump output, to maintain it at a desired maximum pressure, without blocking the connection between the ports 347, 345, which remains effective to dump the front pump so long as the rear pump is delivering sufficient pressure.

Rear pump pressure also communicates through a reduced orifice 348 and a branch passage 350 with the spring chamber 352 at the lower end of valve 308. Chamber 352 communicates with the sump through a port 354. This constitutes a bleed which is always open until the front pump is dumped, but which is closed when, and just as, the spool 336 moves downwardly far enough to dump the front pump. By virtue of this arrangement, a predetermined minimum rear pump volumetric output is required to dump the front pump, and the valve 308 is not forced down by the rear pump, to dump the front pump, until both the pressure and the volumetric output of the rear pump are sufficient so that dumping of the front pump cannot cause an undue drop in pressure in the system. Without the provision of the orifice 348 and the vent 354, there is a tendency for the valve 308 to hunt and buzz, and the pressure in the system tends to fluctuate accordingly. It will be appreciated that without this bleed arrangement, even with the car rolling very slowly, the pressure might build up in the rear pump output sufficiently to move the dump valve 308 down before the volumetric output of the rear pump was sufficient to properly supply the system and take care of leakage.

The rear pump also communicates through an orifice 333 and a passage 334 with a chamber 335 at the head of the piston portion 322 at the upper end of valve 306, and also with a chamber 337 at the head of the piston portion 340 at the end of valve 308. The effective pressure delivered to chambers 335, 337 is regulated by a variable orifice 524 controlled by the position of the throttle. The downward pressure upon the valves 306, 308 exerted by the fluid in the chambers 335, 337 constitutes a counterbias partially offsetting the effect of the valve springs 324 and 352, and the arrangement is such that when the car is standing still, there is no counterbiasing pressure in the chamber 335, because the rear pump is not operating, and the front pump output pressure is accordingly capable of rising to its maximum value. This is desirable for the reason that with the car standing still the torque multiplication of the torque converter may be at its maximum, which requires the highest pressures in the servomotors in order to hold the clutching and braking means properly despite such high torque conditions. When the throttle is open with the vehicle in motion, the pressure in chambers 335, 337 bears an inverse ratio to the extent of throttle opening. Due to the decrease in such counterbias as the throttle is opened wider, the output pressure rises to supply higher fluid pressures for operating the clutches and brake bands, which is desirable when higher torque demands are being made upon these components. This aspect of the control will be considered further hereinafter.

Hydraulic control system: Valvular control components

The output sides of the check valves 310, 316 communicate with a conduit 362 which contains a reduced orifice 364 and which leads to a side port 365 of a selector valve 366 which may be manually operable, as by a control lever mounted on the steering column of the vehicle. Beyond the orifice 364, passage 362 also communicates through a branch passage 368 with a cushioning chamber or pressure dome 370 and an inwardly opening check valve 372, the outlet 374 of which is above the oil level in the transmission casing.

A branch passage 375 connected to the main fluid supply passage 362 between the orifice 364 and the check valves 310, 316 leads to a side port 376 of a converter valve 378. The valve 378 is actuatable by a piston portion 380 which bears against its upper end. The valve incorporates a cylindrical valving spool portion 382 located below and somewhat smaller than the piston portion 380, and another piston portion 384 at the lower end of the valve spaced from and connected to the spool portion 382 by a reduced neck 385. The valve is urged downwardly by a spring 386 bearing downwardly upon the piston 380 and reacting upwardly against a perforated cover plate 388, the apertures 390 in which connect the spring chamber 392 at the upper end of the piston 380 with a chamber 394. Spacedly below the inlet port 376 is an outlet port 396 which communicates with a passage system generally designated 398, which communicates with the interior of the hydraulic torque converter. The passage 375 is also connected by a branch passage 402 to a chamber 400 below the piston portion 384. It will be noted that the supply to the passage 375 which is delivered to the converter valve 378 is derived from the main supply passage 362 after the fluid has passed through the control valve system formed by the valves 306, 308 previously described. Valve 378 controls the pressure in the interior of the hydraulic torque converter in relation to main pump output pressure in a manner which will presently be described.

In the actual transmission construction, some of the oil passages are not illustrated, being out of the plane of the paper, but the provision of the requisite oil passages is well within the capability of persons skilled in the art. The passage system 398 communicates with a longitudinal passage 399 (Fig. 1A) which extends through the space between the outside of the sleeve 138 and the inside of the sleeve 158 and which delivers oil to the interior of the overrunning brake 21 within the stator 16 of the hydraulic torque converter. The oil then moves radially outwardly through passages extending through the overrunning brake, and which are not specifically designated by reference numerals, and into the interior of the torque converter. The returning oil from the torque converter moves rearwardly through a passage 401 between the shaft 20 and the sleeve 138 to a radial hole 410 formed in the sleeve 138 just to the rear of the plate 167 which forms the rear section of the casing for the front pump 165. The hole 410 communicates with a cushioning chamber 412 which is formed by a rearwardly offset portion of the partition 414 which closes the forward end of the gearing compartment defined by the casing portion 260. The upper portion of the chamber 412 contains trapped air forming a resilient cushion. An outwardly open check valve 406 also communicates with the chamber 412, and the returning oil from the torque converter can pass outwardly through an opening 408 and through the check valve 406 and passages 415, 416 and 419 to lubricate the rotating parts which are supported in the fixed hub 142 of the partition 414, as will be seen upon examination of Fig. 1B. When the piston 100 moves rearwardly to engage lock-out clutch 22, it must displace oil from the torque converter. It will be seen that the provision of the cushiong chamber 412 and check valve 406 permits the piston 100 to move more rapidly in both directions. The cushioning chamber 412 is also diagrammatically illustrated in Fig. 6 located in the line leading to the torque converter although in the structural embodiment shown in Fig. 1A it is actually located in the outlet from the torque converter. The action is substantially the same in either case.

As also shown in Fig. 6, the passage system 398 leading to the hydraulic torque converter is connected to the rear pump output through an orifice 908 and check valve 906 and passages 404, 405. The check valve 906 opens toward the passage 398, so that fluid can be supplied to the torque converter from the rear pump when the vehicle is moving, even before the front pump is dumped, so that when the front pump is dumped there is no sudden undue drop in pressure in the system supplied by the rear pump. Experience has shown that the presence of the orifice 908 and check valve 906 provides a damping action which prevents buzzing of the converter valve.

A piston-type relief valve 425 is arranged in axial alignment with the converter valve 378, the chamber 394 being arranged between valves 425, 378, and the head of valve 425 being exposed to the pressure within such chamber. Valve 425 is urged inwardly of chamber 394 by a spring 426 and the pressure in the chamber which communicates with the passage 398 leading to the converter tends to move the valve 425 outwardly to establish communication between chamber 394 and a vent port 428. The valve 425 can open to allow escape of fluid when the piston 100 moves in a direction to engage clutch 22.

The illustrated control arrangement is so designed that the vehicle normally starts in the second speed or intermediate gear, the low forward gear being employed only as an emergency low. With the selector valve in the drive position in which it is shown in Fig. 6, which is the position in which it is normally kept during all forward driving, except during emergency conditions, the fluid from the main line 362 enters the valve at port 365 and leaves the valve at port 433, these ports being connected by a reduced portion 434 of the valve and being isolated from other parts of the valve chamber by valve spools 435 and 436. From port 433, the fluid passes through a passage 438 and connecting passageways leading to the actuating cylinder 67 for the clutch assembly 55, where it may act upon the piston 62 to engage such clutch. A portion of such passageway system shown in Fig. 1C comprises a manifold inlet port 440 formed in the sleeve 235, a radially drilled hole 442 in such sleeve, a longitudinal channel 440 formed in the manifold sleeve 244, a communicating manifold port 445 (Fig. 1B), a groove 446 in the outer wall of sleeve 235 and a passage 447 extending through the surrounding wall of hub 225. The fluid thus enters the space 67 behind piston 62 to apply clutch 55.

The passage system leading to the actuating cylinder 67 for the clutch 55 is designated in Fig. 6 by the general reference number 439. A branch passage connected to the passage 439 is designated 494 and leads to a port 495 formed in the side of the governor valve housing portion 279 and opening thereinto in a position such that it is normally open to a drain port 502 by the neck portion 503 of the governor actuated valve 285. A branch passage 496 connected to the passages 494, 495 opens through a lower portion of the governor valve housing 279 in a position such that it is normally covered by the lower governor valve 288. The port which forms the terminus of the passage 496 is denoted 498. When the valve 285 is moved downwardly a predetermined distance, it connects the port 495 to a port 500. It will be noted that when the valve 285 is raised, the port 500 is connected to the vent port 502, but that the vent port 502 is closed, and the ports 495—500 are connected, when the valve moves downwardly. Connection of the ports 495, 500 supplies fluid to a passage 504 leading to a chamber 505 at the lower end of a shift control valve, generally designated 506. The fluid in the chamber 505 acts upwardly upon a piston portion 508 formed at the lower end of the valve and also upon a shoulder 510 which joins the piston portion 508 to a larger spool portion 512. The lower part of the spool 512 is surrounded by another valve chamber 514, and it will be noted that the reduced portion 515 of the valve casing structure through which the piston portion 508 extends is somewhat larger than the piston portion 508, so that communication is established between the chambers 505, 514 (except when the shift control valve is raised, at which time such communication is closed by an enlarged head portion 509 on piston 508).

Fluid from the rear pump is also supplied to the chambers 505, 514 by way of passages 314, 405 and through an orifice 516 and a passage 518 leading into the side of chamber 514, so that rear pump pressure also tends to lift the valve 506. A branch passage 520 connected to the passage 518 leads to a port 522 formed in the side of the governor valve housing 279 nearer the bottom thereof, but above the restricted variable orifice 524 which opens through the side of such housing, near the bottom of the path of movement of the valve 288. Orifice 524 is connected to a passage 525 which also communicates with passage 334 leading to the counterbiasing chambers 335, 337 of the pressure regulating valves 306, 308, and is also connected to the rear pump output passage 314 through orifice 333, as previously explained.

The orifice 524 may consist of a plurality of small holes arranged in vertical relation, or of a narrow vertical slot, the total cross-sectional area of all such holes, or of the full slot, being of a desired relation to the cross section of the orifice 333, through which the orifice 524 is connected to the rear pump output line 314. Accordingly when the throttle is open relatively wide, the pressure from the rear pump is substantially relieved in the counterbiasing chambers 335, 337 of the pressure regulating valves 306, 308, and the output pressure in the main line is relatively high, whereas when the throttle is closed the chambers 335, 337 receive the full pressure from the rear pump and the output pressure in the main line is relatively low. With no rear pump pressure, for instance when the car is standing, there will be no pressure in the chambers 335, 337 and the output pressure in the main line is at its maximum.

The valve 288 is moved upwardly whenever the accelerator pedal is depressed, and such upward movement stresses the spring 286 to increase the upward bias upon the valve 285. The actuating means for the valve 288 is shown as comprising a rod 526 pivotally connected to an arm 528 which is actuatable by the accelerator pedal or throttle control shaft 531. A spring-pressed detent 532 is positioned in the path of an angular portion 534 of an arm 530 that is connected to the throttle control shaft, so that the operator, in depressing the accelerator pedal beyond this point, will be able to feel the increased resistance and know that such predetermined detent position has been reached. The limit of accelerator depression is indicated as fixed by a stop wall 535 which engages the side of the detent when the accelerator is fully depressed.

A reduced stem portion 536 of the valve 288 normally provides connection between a port 538 and a port 540 formed in the side of the governor valve housing 279. Port 538 is connected by a branch passage 542 to the passage 504, while port 540 is connected by means of a passage 544 to a chamber 545 at the lower end of a lock-out clutch valve generally designated 546.

A branch passage 550 is connected to the outlet from the check valves 310, 316 via passages 368, 362, and serves to conduct fluid from the main fluid supply line 362 around the selector valve. Such fluid is adapted to be delivered by way of the anticreep valve 360 to a passage system generally designated 552 leading to the actuating means for the clutch 56.

Passage system 552 is also conducted through the manifold means shown in Figs. 1B and 1C and formed in the portions 235, 244 and 225, the fluid being delivered to the space 69 between partition 54 and the piston 65.

Conduit 552 through which fluid is supplied for the operation of the clutch 56 is connected through the bearing support 236 (Fig. 1C) to a peripheral groove 564 in the outer manifold sleeve 235. Groove 564 is in turn connected through a radial hole 565 to a longitudinal groove 566 in the inner manifold sleeve 244. Groove 566 leads forwardly through the assembly of manifold sleeves to a port 568 (Fig. 1B) extending through the outer manifold sleeve and communicating with a radial hole 570 in the hub 225, fluid being fed through the hole 570 into the cylinder 69.

It will be noted that the fluid supply passage 550 is also connected to a side port 572 of a release or timing valve 574 for the clutch 56. Valve 574 has spaced upper and lower spools 575, 576 joined by a reduced neck 578. The neck is long enough and the parts are so proportioned that when the valve 574 is in the down position shown in Fig. 6, communication is established through the valve chamber between the port 572 and an outlet port 580. Outlet port 580 communicates through branching passages 582, 584, with a port 585 formed in the side of the chamber of valve 360 and with a chamber space 586 at the lower end of the valve 360. It will be noted that the valve 360 also includes upper and lower spool portions 588, 590 spacedly connected by the neck portion 556, but that the lower spool 590 is substantially smaller than the upper spool 588. A separate but coaxially slidable piston 592 is arranged to bias the valve 360 in the opposite direction from the direction in which it is urged by the spring 555 whenever fluid is delivered to a chamber 594 from the rear pump, chamber 594 being connected to the rear pump output passage 314 by passages 595, 405. The proportioning of these parts is such that the rear pump pressure is sufficient to move the valve 360 all the way up against the resistance of spring 555, whenever the rear pump is turning faster than a rate which would correspond to a very low vehicle speed.

Since the disclosed system is intended to start the vehicle in the second gear ordinarily, and the clutch 56 is not employed in the second gear drive, the fluid supply to the passage 552 is interrupted whenever the vehicle is moving in second speed (or normal starting gear setting of the selector valve 366). This interruption is accomplished through the valve 574. Fluid is delivered through a branch passage 598 which communicates with the outlet passage 438 from the selector valve 366 to a chamber 600 formed at one end of the chamber of valve 574. Whenever the selector valve is in the drive position as shown, with the engine running and the car standing still, the valve 574 is held up by the pressure in the chamber 600 and the valve 360 stays down far enough to cut off the port 585. No fluid then reaches line 552 except the throttled, reduced pressure fluid which passes through the partially closed port 602 and out via port 560, and which holds the valve 360 in a partially raised throttling position by reason of the fact that the spool 588 is bigger than the spool 590. This reduced pressure fluid maintains the clutch 56 engaged at light pressure (as a part of the anticreep means). As soon as the vehicle begins to move, rear pump pressure raises the valve 360 so that the spool 590 blocks the port 602. The valve 574 being also raised, all supply to the actuating means for clutch 56 is cut off, and fluid is supplied only to the actuating means for clutch 55 through passage 439, as previously described. The brake band 68 is also engaged, since no fluid is being supplied to the passage 490 leading to its releasing cylinder 450.

It will also be noted that the valve 574 is biased downwardly by pressure delivered to a chamber 605 formed at the upper end thereof through a conduit 606 connected to the conduit 398 through which fluid is supplied to the hydraulic torque converter. The converter relief valve 378 is set for a pressure lower than the front pump pressure determined by the regulating valve 306. Referring to the converter valve 378, it will be seen that the lowermost piston portion 384 is smaller than the piston 380 at the upper end of the valve, and that the valve 378 is biased downwardly partially by a spring 386, but principally by converter pressure acting downwardly upon the top of piston 380. Fluid pressure in the main line 362 tends to move the valve 378 upwardly until spool 382 partially uncovers port 376, to establish communication between the ports 376, 396. The valve 378 thus acts as a pressure regulating valve in supplying fluid to the hydraulic torque converter, maintaining the pressure in the hydraulic torque converter at a lesser value than that in the main line. Whenever the pressure in the converter and passage system 398 is such that the effect of such pressure, plus the force of spring 386, in chamber 392, cannot hold valve 378 down against the main line pressure in chamber 400, the pressure in the chamber 400 raises the converter valve 378 to allow enough fluid from the passage 375 and main line 362 to enter the passage 398 to raise the pressure in the torque converter system to the desired value. If the rear pump is not operating, the pressure is held in the converter system by the check valve 906, and it will be noted that as soon as the engine is started, front pump pressure in the main line is effective to bring the converter pressure up to the desired value. The converter pressure is also limited to a value less than the front pump output pressure, as stated, and thus even when only the front pump is operating, the pressure in the chamber 600 at the lower end of release valve 574 is greater than the converter pressure in chamber 605 at the upper end of the valve 574, so that such valve is biased upwardly so long as fluid from either pump is being supplied through the selector valve to the passages 438, 598. When the engine is stopped, however, the pressure trapped in the converter system acts upon the upper end of the valve 574 to positively return it to the position shown.

*Hydraulic control system: Anticreep*

The operation of the anticreep valve corresponds generally to the operation of the anticreep valve shown in the embodiment of Fig. 3 of my copending application Serial No. 171,042, filed June 29, 1950. When neither pump is operating, this valve stands in a position corresponding to the lowermost position of its movement, as illustrated in Fig. 6, toward which position it is urged by the compression spring 555. At such time, a reduced mid section 556 of the valve provides communication between an inlet port 558 which is connected to the passage 550 and an outlet port 560 to which the passage 552 leading to the actuating means for clutch 56 is connected.

If the vehicle is moving in the starting gear, and is slowed down sufficiently with the selector valve still in the drive position and before an upshift to direct drive has occurred, the valve 360 moves down as soon as the drop of rear pump pressure permits (rear pump pressure bleeds through the orifice 348 and vent 354 as previously described). The valve 574 stays up, however, since the engine is running and supplying pressure to the chamber 600. The front pump is also supplying pressure to the inlet port 602 of the valve 360. Since the upper spool 588 of the latter valve is larger than the lower spool 590, as previously noted, valve 360 now acts as a self-throttling valve, being urged upwardly so that the spool 590 tends to close off communication between the ports 558, 560 to the extent required to reduce the pressure in the passage 552 to a relatively low value, which holds the clutch 56 engaged at light pressure.

It will be observed that if the anti-creep valve 360 moves up far enough, the top spool 588 opens the port 585, and that this opening commences at approximately the same time as the spool 590 completes the closing of port 602, during such upward movement of the valve. The release valve 574 is raised at this time, and the opening of the port 585 by the anti-creep valve 360 thus permits a venting of the servomotor for the clutch 56. This venting occurs at the side vent port 608 of the shift control valve 506. The shift control valve is down at such time, since the vehicle is in the starting gear, and the vent connection is by way of port 560, past the neck 556 of the anti-creep valve and via port 585, passage 626, port 580, past the neck 578 of the release valve 574 and by way of port 620, passage 618 and port 612 to the shift control valve, and past the neck 614 of the shift control valve to the vent port 608. During the throttling action of the anti-creep valve 360, which maintains the light holding pressure in the servomotor for clutch 56, to hold the car against creeping, therefore, the vent opening just described fixes a limit upon the pressure which can be developed in the servomotor, since if such pressure rises too high, the vent just described can open sufficiently to allow the pressure in the servomotor, and thereby the holding effort exerted by clutch 56, to fall to the desired value. The clutch 55 is also engaged, since front pump pressure is being supplied to the passage 439 and the band 68 is of course also engaged. Both planetary gearsets are thus locked up and both gearsets are also held stationary by the band 68, so that the propeller shaft is held against rotation and slip takes place in the hydraulic torque converter. Since the clutch 56 is held engaged with relatively light pressure under such conditions, this anti-creep holding means is not unduly severe. In event the car should be pushed, or other substantial force applied to it, the clutch 56 can slip.

*Hydraulic control system: Ratio changes*

When with the vehicle traveling in the starting gear range, the speed of the vehicle becomes great enough, the upper governor valve 285 is moved downwardly to connect the ports 495, 500. Fluid from the selector valve outlet 438 is then delivered through the passages 494, 504 to the lower end of the shift control valve 506, and such valve is moved upwardly to cause the spool 512 thereof to close on vent port 608 and to connect together two ports 610, 612 of the valve 506. Such ports are then connected by a reduced neck portion 614 which unites the lower spool 512 with the upper spool 615 of the valve. Communication is thereby established between a passage 616 which is connected to the passage 439 which supplies actuating fluid for clutch 55, and a passage 618 which is connected to a port 620 formed in the side of the casing of the release valve 574 for clutch 56. Port 620 is located in a position to be blocked by the upper spool 575 of valve 574 when such valve is down. The passage 618 is also connected to a port 622 formed in the side of the chamber of a releasing valve 625 for the forward drive brake band actuating means, comprising the cylinder 450 previously described.

It will be remembered that both of the clutches 55, 56 must be engaged for the high speed drive. Both of the valves 574 and 360 being raised, the fluid is delivered from the port 620 past the reduced neck portion 578 of the valve 574 and through port 580, passage 626, port 585, past the reduced neck portion 556 of valve 360 and through port 560 and passage 552 to the actuating cylinder 69 for the clutch 56.

When fluid is supplied for actuation of the clutch 56 through the passage 618 in the manner described, it is also delivered through a branch passage 628 to a chamber 630 at the lower end of the valve 625. Although converter pressure is delivered from the passage 606 to a chamber 632, at the upper end of the valve 625, the pressure in line 618 and chamber 630 is higher than the converter pressure, so that the valve 625 is then raised to establish communication between the port 622 and the passage 490 leading to the releasing mechanism for the forward speeds brake band 68. When valve 625 is thus raised, a lower spool portion 634 thereof blocks a lower port 642 thereof, and the reduced neck 638 connects the port 622 to a port 640 to which the passage 490 is connected. Brake band 68 is thereby released for the direct drive.

A passage 635 is connected to the port 642, which is spaced slightly below the port 640 of forward release valve 625, so that when the valve 625 is lowered, the fluid supply passage is cut off at the port 622, and communication is established between the two passages 490 and 635. Under such conditions, the selector valve 366 being in the D position, the releasing cylinder 450 for the brake band 68 is connected to atmosphere or vented, since the passage 635 terminates at a port 644 in the side of the selector valve 366, port 644 then being in communication with a reduced portion of the selector valve defined by a neck 645 between the spool 436 and a spool 646 spacedly to the left thereof. An angular passage 648 in the spool 646 connects the chamber space defined by the reduced neck portion 645 with the side of the enlarged spool portion 646, and with the selector valve in the forward drive position shown, the angular passage 648 registers with a vent port 650. The valve 625 will thus be seen to constitute means for closing the vent for the forward speeds brake release cylinder 450, and for connecting the supply of actuating fluid thereto to release this brake in the high speed or direct drive.

When with the car traveling in the high gear ratio, the accelerator pedal is manipulated throughout its normal range only, there is a constant connection between the outlet passage 504 of the upper governor valve 285 and the passage 544 leading to the chamber 545 at the lower end of the lock-out clutch valve 546. Fluid from the selector valve outlet 438 is resultantly delivered to the actuating means for the lock-out clutch 22 previously described for the hydraulic torque converter. Such fluid moves through the passages 438, 439, a branch passage 660 to a port 662 in the side of the chamber of the valve 546. Valve 546 being in its raised position, the port 662 communicates with an outlet port 664 past the reduced portion of the valve defined by the neck 665 which joins the upper and lower spool portions 666, 668. At such time, the vent passage 670 is closed by the lower spool 668. The chamber 672 above the upper spool 666 is connected to the converter line 398 by the passage 606, so that the valve is returned to the lowered position by converter pressure, when the pressures fall away in the other parts of the control system. The outlet port 664 is connected to a passage 674 which communicates with the annular piston space 91 between the flange 90 of the pilot member 92, and the piston 100, shown in Fig. 1A. The passage 674 is connected through a passage 675 (Fig. 1A) to a peripheral groove 676 formed in the shaft 20 within the area surrounded by the bearing supporting portion 142. Groove 676 communicates through radial passages 678 with the axial hole 99 in the shaft 20, which in turn communicates with the pilot bearing socket 98 (Fig. 1A) from which radial passages 680 extend outwardly into the piston chamber 91.

Whenever, with the car moving in high gear, the accelerator pedal is momentarily released to relieve the torque upon the blocker ring 112, the lock-out clutch will engage, since fluid pressure is present in the piston chamber 91, and the piston 100 will move rearwardly to engage the lock-up clutch as soon as it is unblocked in the manner previously described. The drive will then continue with the torque converter locked-out until the car slows down to a predetermined speed.

If the car slows down to a predetermined speed without full depression of the accelerator, the upper governor valve member 285 moves upwardly, so that the lower spool portion 287 thereof again blocks the port 495. This cuts off the delivery of fluid to the chamber 505 of the shift valve by way of the upper governor valve 285, but fluid is still being delivered to the chamber 514 from the rear pump via passage 518, since the car is still in motion. Such fluid holds the shift control valve 506 up until the car slows down to a still lower speed. There is thus a speed range under such conditions wherein, although the governor has called for a downshift, the shift valve stays up and the car continues in the high gear. The lower end of the neck portion 508 of shift valve 506 carries a head portion 509 of a larger diameter than the neck, and which is proportioned to accurately fit and close the throat portion 515 when the shift valve is in the up position. Inasmuch as the spool 512 is bigger than the head 509 at the lower end of the shift valve 506, this valve is biased upwardly by rear pump pressure under such conditions, and the head 509 closes communication between the chambers 514, 505, so that rear pump pressure cannot be fed to the chamber 545 at the lower end of the lock-out clutch valve 546 via the passage 504, and passages 542, 544, as previously described. Since the feed to the port 500 of the governor valve is also cut off, the pressure is no longer maintained at the lower end of the lock-out clutch valve, and the converter pressure which is applied to the chamber 672 at the upper end of the lock-out clutch valve moves the latter valve downwardly permitting disengagement of the lock-out clutch in the manner previously described. Under such conditions, the vehicle accordingly proceeds in high gear, but with the torque converter in the line of drive. If the throttle should be opened wider, the lower spool 537 of the lower governor valve 288 would move up to open the port 522, relieving the pressure in chamber 514 and allowing the shift valve 506 to re-establish the starting gear drive. Full depression of the accelerator also causes the ports 498, 540 of the lower governor valve to be placed in communication by the neck portion 536 of the valve, so that the lock-out clutch valve 546 is again moved upwardly, but the lock-out clutch will not engage until the accelerator is released to allow a torque reversal, so that under such conditions, accelerating from a low speed, both the torque converter and gearing are made available.

By way of example, it might be suitable to proportion the parts so that the governor would call for a downshift, upon gradual deceleration of the vehicle, at about 13 miles per hour. The rear pump biasing pressure in the chamber 514 would hold the shift valve 506 up, however, as the car slowed down still further, below 13 miles per hour, although at that speed the hydraulic torque converter would be put back in the line of drive in the manner described. Assuming continuous light throttle, further slowing down of the vehicle, for example to approximately 6 miles per hour, would allow the rear pump pressure to fall slightly. The spring 613 biasing the shift valve 506 downwardly is proportioned to overcome the rear pump biasing pressure at such a suitable desired speed, so that the valve 506 will move down and a downshift to the geared ratio will then occur. After such a downshift, with the car proceeding in the geared ratio, the anticreep valve 360 and the release valve 574 for the clutch 56 remain up and the actuating cylinder 69 for the clutch 56 is vented, the passage 552 leading to the clutch 56 being connected through ports 560 and 585 of the anticreep valve, passage 626 and ports 589 and 620 of the clutch release valve 574 to the passage 618, which then communicates via port 612 and past the reduced portion 614 of the valve 506 with the vent port 668. Analogous provisions are made for venting each of the other actuating cylinders when the delivery of fluid thereto is interrupted.

When the car is proceeding in high gear at a speed above the governor downshift speed (e. g. 13 miles per hour) and the throttle is opened wide (with the vehicle speed slow enough, however, so that a kickdown is possible), the pressure in chamber 514 of the shift valve 506 is dumped at the port 522 of the lower governor valve 288, and the pressure in the shift valve chamber 505 is dumped by the upper governor valve through the port 502. However, the lock-out clutch valve is held up by the connection of the ports 498, 540, connecting the pressure line 498 with the chamber 545, which is effected by the lower governor valve, and the torque converter remains locked out of the line of drive. Immediate geared acceleration is thus available without the lag which is inherent in the slippage of the hydraulic torque converter.

It will be noted also that a kickdown shift cannot occur if the speed of the vehicle is so great that the upper governor valve cannot be moved upward by the spring 286 against the downward force exerted by the flyweights.

When the vehicle is at rest, or substantially at rest, the pressure in the counterbiasing chambers 335, 337 of the pressure regulating valves is zero or at a minimum. The pressure regulating valves thus tend to maintain the maximum pressure in the hydraulic torque converter under starting conditions when the transmission of torque through such converter is at a maximum. The torque handled by the converter falls away rapidly as its turbine member comes up to speed, but when at high loads and substantial throttle openings greater torque demands are placed upon the components of the transmission, the counterbias again falls away, due to the opening of the variable orifice 524, so that relatively high engagement pressures are applied to the clutch and brake means of the transmission. This will be seen to avoid the necessity of maintaining high pressures when not required by operating conditions, thereby considerably increasing the overall efficiency of the transmission.

When the shift valve 506 drops, the fluid pressure is simultaneously relieved in chamber 630 at the lower end of the release valve 625 for the forward speeds brake band 68 (line 618 being connected to vent 608 by the dropping of shift valve 506). Valve 625 therefore moves down, cutting off the supply line 490, which is then again vented through passage 635 and port 650 of the selector valve, so that band 68 is reapplied for the lower speed drive.

The pressure in the main fluid supply system varies substantially in accordance with the torque demand, due to the control of the counterbiasing action by variable orifice 524 as previously brought out. The converter valve 378 maintains a pressure differential between the main supply pressure and the pressure in the converter system and therefore the pressure in the converter system also varies in accordance with torque demand. This differential, as determined by the action of the valve 378, is set at about the value that is required to permit a clutch or brake which is to be engaged to effect an upshift to be applied or engaged with sufficient force to take over the drive. In shifting from low to second gear, the release valve 574 must be moved upwardly against converter pressure in the chamber 605, and in shifting from second to high, the forward release valve 625 must be moved upwardly against converter pressure in the chamber 632. When the car has been moving in low gear, the release valve 574 is down, since no pressure exists in the chamber 600 with the selector valve in the "L" position. Converter pressure is present in the upper chamber 605 of the valve 574, so that when the selector valve is moved to the "D" position, the shift to second gear cannot occur until the pressure in the chamber 600 rises above the converter pressure. This insures that the clutch 56 will not be released until there is enough pressure available in the line 439 and the actuating cylinder 67 for the clutch 55 to take over the drive.

In shifting from second gear to direct drive, clutch 56 must be re-engaged and brake band 68 must be released, fluid pressure being required to perform both of these operations. Although in second gear the release valve 574 for the clutch 56 is up, so that fluid can pass through this valve as soon as the shift control valve 506 drops, the release valve 625 for the forward brake band 68 is down, and accordingly the valve 625 cannot be moved upwardly until the pressure delivered to the chamber 630 at its lower end rises above the converter pressure in its chamber 632, so that the valve will then move upwardly to allow pressure fluid to move through the ports 642, 640 and via passage 490 to the servomotor 450 for band 68, to release the band 68 only after there is sufficient pressure to actuate clutch 56 to take over the drive.

In reverse, the reverse interlock valve performs a timing function in that it prevents delivery of fluid via line 704 to the actuating cylinder 700 for the reverse drive brake band 36 until the pressure rises high enough in the passage system 490 leading to the release cylinder 450 for the forward drive brake band 68 to release the latter.

I may also provide manual means for preventing engagement of the lock-out clutch in order that the flexibility and torque converting effect of the hydraulic torque converter may be maintained in the line of drive at all times. This is preferably operated by a manual control such as a button on the instrument panel (not shown) through the agency of which a blocking rod 685 may be moved to a position to prevent upward movement of the valve 546. The blocking member 685 is shown as comprising a rod slidable axially through the upper casing portion of the valve 546 to and from a position to hold such valve against upward movement.

When the selector valve is moved one position to the left, from the position shown in Fig. 6, to the "L" or lock-up emergency low position, the spool 435 moves to the left of the port 433 and the inlet port 365 from the main fluid supply line 362 and then blocked, being isolated between the spools 435, 436. The passage 635 is still connected to the vent port 650 by the reduced spool portion 645 of the selector valve which bridges the selector valve ports 644, 650. The anticreep connection between the main line and the port 602 of anticreep valve 360 is still effective by way of the conduit 550. Release valve 574 for clutch 56 cannot move up because there is no source of fluid supply for the chamber 600 which constitutes the sole means for lifting the valve 574. Chamber 600 and the line 439 to the actuating means for clutch 55 are vented via passage 438 and the open right end of the casing of valve 366.

The fluid from the main line 362 which by-passes the selector valve 366 via the line 550 is conducted through the release valve 574 for clutch 56, from the port 572 to port 580 past the neck 578 and into the passage 626, from which it is led to the chamber 586 at the lower end of the anticreep valve 360 through passage 584. The pressure in chamber 586 thus augments the upward force exerted on the spool 588 by the portion of such by-passed fluid which is led directly to the port 602 of the anticreep valve, and the parts are so proportioned that the total upward force on the anticreep valve under such conditions is sufficient to raise the valve against the effort of the spring 555, even when the vehicle is stationary (rear pump not operating). Therefore, with the selector valve in the "L" setting, the anticreep valve rises to block the port 602 and uncover the port 585, establishing a full pressure fluid conductive connection through the anticreep valve from the port 585 past the neck 556 of the outlet port 560. It will be seen that the only brake and clutch means engaged under these conditions comprise a brake bank 68 and the clutch 56. This is the condition required for low gear operation, and under such conditions, low gear remains effective until the position of the selector valve is changed.

When the selector valve is moved all the way to the left to the reverse position, marked "R," the spool 436 moves to the left of the port 644, while the spool 435 is still to the right of the inlet port 365 and communication is established between the inlet port 365 from the main line and outlet port 644 past neck 434. Valve 625 is then in the down position, and fluid is delivered to the release cylinder 450 for the forward speed brake band 68 by way of passage 635, ports 642, 640, passage 490, etc. as previously described, to release the forward speeds brake band 68. Fluid is also delivered through a port 690 and a passage 692 to a chamber 694 at the lower end of a reverse interlock valve 636. Such pressure moves the valve 636 upwardly against the resistance of its biasing spring 695, closing the vent port 696 for the reverse brake band actuating cylinder 700, which is connected by line 704 to an outlet port 702 of the valve 636 located at a point between the chamber 694 and vent port 696. Fluid then passes under the lower spool 703 of valve 636 to port 702. Port 702 is connected to the cylinder 700 by a passage system generally designated 704. At the upper end of the valve 636 is a chamber 705 which contains the spring 695 and which is connected through passageways 706, 404 and 405 to the rear pump output line 314. When the rear pump 240 is rotating backwards because the car is moving rearwardly, this pump generates no pressure, but when the car is moving forwardly, rear pump pressure in chamber 705 keeps the valve 636 from moving upwardly, and the reverse brake bank 36 accordingly cannot be engaged. This eliminates the danger of throwing car into reverse when moving forwardly. Pressure is at the same time delivered to the actuating cylinder for the clutch 56 through the ports 572, 580 of the release valve 574 for the clutch 56, and through ports 585, 560 of the anticreep valve as in the low gear operation previously described. The parts are thus conditioned for reverse operation.

When the selector valve 366 is moved one notch to the right from the position shown in Fig. 6, to the neutral position designated "N," the main fluid supply line is connected to the conduit 490 which supplies the release cylinder 450 for the brake band 68, and fluid is also supplied to the actuating cylinder for the clutch 56 by way of the passages 368, 550, valves 574—360, etc., as just described in connection with the reverse drive arrangement. Connection to the passage 490 is through the portion of the chamber of selector valve 366 surrounding the neck 645 and through the angular valve passage 648 which connects such chamber to the port 644, and via passage 635 and ports 642, 640 of forward brake release valve 625. The other ports of the selector valve 366 are isolated from the inlet port 365 by the spools 436, 646. Thus in neutral, with the engine running, clutch 56 is engaged and the other clutches and brakes are disengaged.

When the selector valve is moved one position farther to the right, to the park position designated "P" in Fig. 6, the inlet port 365 to the selector valve is completely blocked. Fluid is still supplied to the line 552 to engage the clutch 56 and the band 68 is also engaged, since no fluid is being supplied to the line 490. (Line 490 is vented through port 644 and past neck portion 647 of the selector valve 366 to vent port 650.) Movement of the selector valve 366 to the park position also urges the locking dog 200 in a direction to cause a tooth 710 carried by such dog to enter one of the holes 198 formed in appropriate position in the periphery of the drum 35. The dog 200 is actuated by an arm 714 pivoted upon a fixed pin 715 in the transmission case, and so connected to the actuating hand lever for the selector valve that it is rocked inwardly toward the drum when the hand lever is moved to the park position, simultaneously with movement of the selector valve to such position. The arm 714 does not act directly upon the dog 200 in an inward or latching direction, but urges it inwardly toward the drum 35 through the agency of a compression spring 716 trapped between the arm and the dog, as shown in Fig. 6. Thus if the tooth 710 is not in alignment with one of the holes 198, it is urged inwardly against the drum and enters one of such holes as soon as the drum rotates sufficiently to permit it. When the hand lever is moved away from the park position it moves the arm 714 outwardly to cause the arm to engage a lug 712 carried by the latch piece 200 and pull the latch piece free of the drum. Another lug 718 on the dog 200 serves as an abutment for the spring 716, and also as an abutment engageable by an interlock plunger 720 slidable to and from a blocking position, in which it is shown in Fig. 6, in which it positively holds the dog 200 away from the drum 35, so that the tooth 710 clears the drum and cannot prevent rotation of the latter.

The plunger 720 is biased away from such blocking position by a spring 722, but is moved into and held in the blocking position whenever the rear pump is generating pressure. An actuating piston portion 724, shown as formed integrally upon the lower end of the plunger 720, is connected to the passage 404, leading to the rear pump output, by passages 725, 726. The plunger 720 is also movable upward to the blocking position by a plunger 728, which is separate from the piston portion 724, but slidable in a coaxial downward extension of the cylindrical chamber 730 in which the piston 724 is slidable. The passage 725 is connected to a port 732 which enters chamber 730 between the piston 724 and plunger 728. The cylinder portion 730 below the plunger 728 is connected by a passage 734 to the passage system 490 leading to the release cylinder 450 for the forward speeds brake band 68. Delivery of fluid to the release means for the brake band 68 thus also acts to hold the plunger 720 in the blocking position in which it prevents engagement of the parking latch.

Whenever the hand lever is shifted to the park position from any position (neutral, third or reverse) wherein the brake band 68 has been released, the engagement of the brake band 68 is required, and this entails downward movement of the piston 480 (Fig. 5) and displacement of fluid from the cylinder 450 via the conduit 490. Such fluid is conducted through the branch passage 734 to the cylinder 730 below the interlock valve piston 728. The fluid pressure thus applied to the interlock member 720 holds the latch piece 200 away from the drum 35, until the drum has been stopped by the action of band 68.

Whenever the car is moving forwardly, the drum 35 will be turning and the rear pump will be delivering fluid pressure directly to the chamber beneath the upper interlock valve piston 724 via passages 314, 405, 404, 726 and 725. The latch piece 200 is thus held away from the drum in a positive manner which prevents clashing or damage due to an attempt to engage the parking dog while the car is moving forwardly. When the car is moving rearwardly under its own power, the drum 35 is held by the band 36, so that engagement of the parking latch at such time does no harm, merely bringing the car to a standstill as the brake band 68 engages the drum 66.

In the park position, the brake band 68 is held engaged by the spring 474. If a force is exerted tending to roll the car, the carrier 44 is held against movement and so the car cannot roll, since the rear sun gear 45 is held by the band 68, while the internal toothed gear 42 of the rear set is held by the parking latch tooth 710 which locks the drum 35. The rear planet gear and carrier, and driven shaft 30, and 20 the rear wheels, are thus held immovable. When the engine is running with the parts in such park setting, the clutch 56 is also engaged. Thus the front gearset is also locked up, and slip occurs in the hydraulic torque converter, and the planet gears cannot be rotated at excessive speeds by speeding up the engine, because of the drag of the torque converter.

A detail of the actuating means for the clutches 55 and 56 which has not previously been mentioned, and which is shown in Fig. 1B, comprises means for preventing fluid trapped in the cylinders 67 and 69 from applying these clutches under the influence of centrifugal force. Near its periphery the piston assembly 62 is provided with an axial aperture 802 in which is loosely fitted a stem 804. The aperture and stem may be of different cross-sectional shape to permit the passage of fluid past the stem. For example, the stem may be round and the hole square. The stem carries a valve head portion 805 which is located between the piston 62 and the laterally offset annular outer portion 806 of the pressure plate 216. The annular pocket defined by the offset portion 806 also contains a leaf spring 808 which bears inwardly against the valve head 805 and normally urges such valve head against the outer end of the hole 802. The stem 804 is long enough so that when the piston is retracted against the partition 54, as shown in Fig. 1B, which is the position it occupies when the clutch 55 is released, the head 805 is held away from the piston and the hole 802 provides communication between the cylinder space 67 and the annular chamber defined by the offset portion 806 of the pressure plate 216. When the piston moves to the left far enough to engage the clutch 55, the underside of the valve head 805 engages the piston as the stem 804 moves free of the partition 54, so that the valve then closes the opening 802. The spring 808 is strong enough so that it cannot be opened by the actuating pressure applied to the piston. Peripheral openings are formed in the pressure plate to allow any fluid which passes out through the hole 802 to escape into the transmission case. The peripheral openings in the pressure plate are shown in the form of notches 810. By virtue of this arrangement, any fluid in the cylinder and/or in the chamber between the pressure plate and the piston can escape through the holes 802 and 810 and cannot cause unwanted engagement of the clutch. The effective cross-sectional area of the passage provided between the stem 804 and the wall of hole 802 is small, however, with relation to the volume of fluid delivered to the cylinder when actuation of the clutch is instituted by its operating mechanism previously described, so the controlled bleeding arrangement past the valve stem 804 cannot prevent normal and intended operation of the piston. A similar arrangement is provided for permitting escape of fluid trapped in the cylinder 69 behind the actuating piston 65 for the clutch 56. The valve for this purpose is generally designated 812, and detailed description of the means for controlling the escape of fluid from the cylinder 65 will not be required since the parts are substantially the same as those for cylinder 67.

Although the preferred embodiment of the invention herein disclosed is well calculated to fulfill the objects and advantages previously stated, it is to be understood that various modifications may be made without departing from the spirit and scope of the subjoined claims.

What is claimed is:

1. In a transmission, two substantially coaxial mechanically interconnected planetary gearsets, each gearset including a plurality of rotatable elements, and a clutch substantially circumferentially surrounding one of said gearsets and having a plurality of rotatable clutchable elements, one of said clutchable elements being independent of the surrounded gearset and connected to one of the rotatable elements of the other gearset and another of the clutchable elements being connected to another rotatable element of said other gearset, said clutchable elements being operable to lock-up said other gearset.

2. In an automatic transmission system having an input shaft and an output shaft and including hydraulically operable components, a pair of pumps for supplying hydraulic fluid, one pump being operable by the input shaft and the other by the output shaft, a dump valve for venting one of said pumps, means responsive to the pressure developed by the other pump for opening said valve, means defining a bleed opening connected to said other pump, and means responsive to actuation of the dump valve for closing said bleed opening.

3. In an automatic transmission system having hydraulically operable components, two fluid pressure generating devices, a common supply portion connecting said two devices to said components, means limiting transmission of back pressure to either of said devices from the other, means for rendering one of said devices inoperative, pressure responsive means for actuating said last-named means, said pressure responsive means being connected to and responsive to the pressure developed by the other of said devices, means defining a substantially fixed escape passage connected to said other of said devices, and means responsive to the output of said other of said devices for closing said escape passage.

4. In an automatic transmission system including an input shaft and an output shaft and having hydraulically operable control components, a first pump operable by the input shaft, a second pump operable by the output shaft, means for delivering fluid from both pumps to said components including a common delivery passage, a pair of check valves, one check valve interposed between the output of each pump and said passage, a dump valve connected to the first pump between such output and the check valve, an actuator for the dump valve connected to the output of the second pump between such pump and the check valve and operative to actuate such dump valve to dump the first pump when the output of the second pump reaches a predetermined pressure, a metering discharge portion also connected to the output of the second pump, and means for closing such discharge portion concurrently with actuation of the dump valve.

5. In a transmission construction in combination with gearing including a planetary gear set having concentrically disposed sun gear, planet gear and ring gear members, and a planet carrier, shafting supporting the sun gear member from one side of said gear set and supporting the ring gear member from the other side of said gear set, a case supporting the shafting, a reaction brake including a drum connected to the carrier and extending radially outwardly on one side of said gear set and thence laterally around the ring gear member and projecting axially from the other side of the gear set concentrically with respect to the shafting, a drum support rotatable with the drum and extending inwardly therefrom on the opposite side of the gear set and having its radially innermost portion journaled on the casing independently of and to the side of the gearing, and braking means engageable with the drum in substantial circumferential alignment with the drum support.

6. In a transmission construction in combination with planetary gearing, shafting supporting the gearing and a case supporting the shafting, a reaction brake including a drum connected to a part of the gearing and extending laterally therefrom in a direction axially of and concentric with the shafting, a drum support journaled on the casing independently and to one side of the gearing, and braking means engageable with the drum in substantial alignment with the drum support, the drum being keyed to rotate with the bearing but axially movable with relation thereto.

7. In a transmission construction in combination with planetary gearing, shafting supporting the gearing and a case supporting the shafting, a reaction brake including a drum connected to a part of the gearing and extending laterally therefrom in a direction axially of and concentric with the shafting, a drum support journaled on the casing independently and to one side of the gearing, and braking means engageable with the drum in substantial alignment with the drum support, the drum being keyed to rotate with the gearing but axially movable with relation thereto, the drum support and drum being secured to one another against relative axial movement and the drum support being held against unwanted axial movement with relation to the case.

8. In a transmission, two substantially coaxial planetary gear sets, each gear set including a sun gear, a planet carrier, planet gears mounted in the carrier, and a ring gear meshing with the planet gears, the carrier of a first one of said gear sets being rotatable with the ring gear of a second one of said gear sets, means for transmitting a drive to the ring gear of the first gear set and means for taking a drive from the carrier of the second gear set, and a lockup clutch for locking up the first gear set including a clutching element mounted on and supported by and fast with respect to the ring gear of the second gear set, and a second clutch element with which the first clutch element is selectively engageable, said second clutch element being rotatable independently of the second gear set and connected to the sun gear of the first gear set.

9. In a transmission, two substantially coaxial planetary gear sets, each gear set including a sun gear, a planet carrier, planet gears mounted in the carrier, and a ring gear meshing with the planet gears, the carrier of a first one of said gear sets being rotatable with the ring gear of a second one of said gear sets, means for transmitting a drive to the ring gear of the first gear set and means for taking a drive from the carrier of the second gear set, and a lockup clutch for locking up the first gear set including a clutching element keyed upon and surrounding and rotatable with the ring gear of the second gear set in substantially coplanar relation therewith, and a second clutch element with which the first clutch element is selectively engageable, said second clutch element being rotatable independently of the second gear set and connected to the sun gear of the first gear set, both of said clutch elements being located in a position surrounding said ring gear of the second gear set.

10. In a transmission construction, in combination with a case, planetary gearing in the case having a plurality of gear elements, a supporting shaft for one of the gear elements carried by and extending freely inwardly a substantial distance from a wall of the case and carrying said gear element fast thereupon at a point spaced from the case, thereby permitting limited radial floating movement of such gear element, a bearing support for such shaft carried by the case, such support also extending inwardly toward said supported gear element but terminating at a point spaced from such gear element, means for controlling rotation of such gear element and shaft including a brake drum secured to said shaft and overhanging said bearing support, braking means engageable with said overhanging portion of the brake drum, clutching means for controlling another element of said planetary gearing including a clutching element surrounding said gearing, and supporting means for said clutching element including a part rotatably supported upon said shaft between said first mentioned supported gear element and said brake drum, said clutching means being fluid actuatable, and fluid conducting means for said clutching means extending through said shaft.

11. In a transmission construction, a pair of planetary gear sets serially arranged, each gear set including a sun gear, a carrier, a planetary gear and a ring gear, the carrier of a first one of said gear sets being connected to the ring gear of the second of said gear sets, a clutch casing rotatably connected to the sun gear of the first gear set and rotatable independently of the second gear set, two clutches in said casing, one of said clutches being engageable to connect the casing and the sun gear of the first gear set to the ring gear of the second gear set, and the other clutch being engageable and disengageable to make and break a driving connection between said casing and the sun gear of the second gear set.

12. In a transmission construction, a pair of planetary gear sets serially arranged, each gear set including a sun gear, a carrier, a planetary gear and a ring gear, the carrier of a first one of said gear sets being connected to the ring gear of the second of said gear sets, a clutch casing rotatably connected to the sun gear of the first gear set and rotatable independently of the second gear set, two clutches in said casing, one of said clutches being engageable to connect the casing and the sun gear of the first gear set to the ring gear of the second gear set, and the other clutch being engageable and disengageable to make and break a driving connection between said casing and the sun gear of the second gear set, and braking means for holding the sun gear of the second gear set against unwanted rotation without interfering with rotation of said casing.

13. In a transmission construction, a pair of planetary gear sets serially arranged, each gear set including a sun gear, a carrier, a planetary gear and a ring gear, the carrier of a first one of said gear sets being connected to the ring gear of the second of said gear sets, a clutch casing rotatably connected to the sun gear of the first gear set and rotatable independently of the second gear set, two clutches in said casing, one of said clutches being engageable to connect the casing and the sun gear of the first gear set to the ring gear of the second gear set, and the other clutch being engageable and disengageable to make and break a driving connection between said casing and the sun gear of the second gear set, two separate braking means, one of said braking means being independent of said casing and engageable to hold the sun gear of the second gear set against undesired rotation and the other of said braking means being engageable to hold the carrier of the first gear set against unwanted rotation.

14. In an automatic transmission system incorporating torque transmitting components the operation of which depends on the provision and maintenance of hydrostatic pressure, said system being adapted for installation in a vehicle having a driving engine and a throttle control for the engine, means for supplying fluid under pressure for the operation of such components, movable pressure varying means connected to said throttle control and arranged to proportionately urge said pressure varying means in a direction to decrease the effective pressure as the throttle is moved from the open position toward the closed position, and vice-versa, and means responsive to movement of the vehicle to urge said pressure varying means in a direction to reduce the pressure output in proportion to increasing speed of the vehicle, and vice-versa.

15. In an automatic transmission system incorporating torque transmitting components the operation of which depends on the provision and maintenance of hydrostatic pressure, said system being adapted for installation in a vehicle having a driving engine, means for supplying fluid under pressure for the operation of such components, regulating means movable to vary the effective output pressure from said supplying means, and means responsive to movement of the vehicle to urge the regulating means in a direction to reduce the effective output pressure from said supply means proportionately with increasing speed of the vehicle, and vice-versa, and restricting means opposing movement of said regulating means at low vehicle speeds and in response to relatively slight variations of vehicle speed.

16. In an automatic transmission system incorporating torque transmitting elements the operation of which depends on the provision and maintenance of hydrostatic pressure, said system being adapted for installation in a vehicle having a driving engine and a throttle control for the engine, two pressure generating means, one operable by the engine and the other operable in response to movement of the vehicle, a pressure regulating valve movable to vary the effective pressure derivable from the output of the first mentioned generating means, a pressure regulating valve movable to vary the effective pressure derivable from the output of the second generating means, and means responsive to movement of said throttle control to simultaneously influence both of said regulating valves to impose a variable increase in the effective output pressure of both of said generating means in response to the opening of said throttle control.

17. A transmission adapted for installation in a motor vehicle having a speed controller and incorporating a hydraulic torque conveyor and a ratio changing device actuatable by hydrostatic pressure and movable to engaged and disengaged conditions and coacting with the torque conveyor, hydraulic actuating means for said device, hydrostatic fluid pressure generating means responsive to movement of the vehicle, means responsive to actuation of said controller for varying the hydrostatic pressure derived from said generating means and delivered to said torque conveyor, and means in fluid conductive communication with the torque conveyor and connected to said hydraulic actuating means to control disengagement of the drive through said ratio changing device in response to such changes of hydrostatic pressure.

18. In a transmission construction, a pair of planetary gear sets serially arranged, each gear set including a sun gear, a carrier, a planetary gear and a ring gear, the carrier of a first one of said gear sets being connected to the ring gear of the second of said gear sets, a pair of friction clutches, one of said clutches being engageable and disengageable to make and break a two-way driving connection between the sun gear of the first gear set and the ring gear of the second gear set, and the other clutch being engageable and disengageable to make and break a two-way driving conection between the sun gear of the first gear set and the sun gear of the second gear set independently of the previously mentioned connection.

19. In a transmission construction, a pair of planetary gear sets serially arranged, each gear set including a sun gear, a carrier, a planetary gear and a ring gear, the carrier of a first one of said gear sets being connected to the ring gear of the second of said gear sets, a pair of friction clutches, one of said clutches being engageable and disengageable to make and break a two-way driving connection between the sun gear of the first gear set and the ring gear of the second gear set, and the other clutch being engageable and disengageable to make and break a two-way driving connection between the sun gear of the first gear set and the sun gear of the second gear set, two separate braking means, one of said braking means being directly connected to the sun of the second gear set to hold the same against rotation in either direction and the other of said braking means being directly connected to the carrier of the first gear set to hold such carrier against rotation in either direction.

20. In a transmission construction including a planetary gear set incorporating a sun gear, a planet carrier, planetary gears and a ring gear, an output shaft connected to the carrier for taking a drive from said gear set, and means for holding said output shaft against rotation comprising common holding means operatively engageable with both the sun gear and the ring gear, means biasing said common holding means into holding engagement with respect to both the sun gear and the ring gear, and fluid-operable means for releasing said holding means.

21. In a transmission construction, a pair of planetary gear sets comprising a first gear set and a second gear set, both such gear sets having a sun gear, a planet carrier, planet gears and a ring gear, reverse brake means for holding the carrier of the first gear set against rotation, forward brake means for holding the sun gear of the second gear set against rotation, an output shaft connected to the carrier of the second set, and means for holding said shaft against unwanted rotation comprising biasing means for simultaneously engaging both of said brakes.

22. In a transmission construction, a pair of planetary gear sets comprising a first gear set and a second gear set, both such gear sets having a sun gear, a planet carrier, planet gears and a ring gear, reverse brake means for holding the carrier of the first gear set against rotation, forward brake means for holding the sun gear of the second gear set against rotation, an output shaft connected to the carrier of the second set, means for holding said shaft against unwanted rotation comprising biasing means for simultaneously engaging both of said brakes, and fluid operable means for releasing both of said brakes.

23. In a transmission construction, a pair of planetary gear sets comprising a first gear set and a second gear set, both such gear sets having a sun gear, a planet carrier, planet gears and a ring gear, reverse brake means of the friction type for holding the carrier of the first gear set against rotation, forward brake means of the friction type for holding the sun gear of the second gear set against rotation, an output shaft connected to the carrier of the second set, and means for holding said shaft against unwanted rotation comprising means normally biasing both of said brakes to the engaged condition, a supplemental brake of the positive latch type for one of said friction brakes, and separate manual means for engaging the supplemental brake.

24. In a transmission having input and output members and adapted for installation in a motor vehicle, a hydraulic torque conveyor, hydraulically operable ratio changing means arranged in a line of drive with said torque conveyor, means for supplying fluid under pressure to said torque conveyor and to said ratio changing means, said fluid supplying means including a first pump operable by the transmission input member and a second pump operable by the transmission output member, common output mixing and supply means for delivering fluid from both pumps to the conveyor and to said ratio changing means, check valve means for preventing backflow from either of said pumps to the other pump, means for rendering the first pump inoperative when the output of the second pump rises to a predetermined value, means defining an escape opening connected to the second pump, and means for closing said escape opening concurrently with actuation of said means for rendering the first pump inoperative.

25. In a transmission construction adapted for installation in a vehicle and having a driving element connectable to an engine and a driven element connectable to the driving wheels of the vehicle, a hydraulic torque converter and additional torque converting means hydraulically operable means for controlling the action of the last mentioned torque converting means, said hydraulic torque converter and additional torque converting means being arranged in series with one another and with said driving and driven elements, means for supplying fluid under pressure to said hydraulically operable controlling means to actuate the same to engaged and disengaged condition and for supplying fluid under a lower hydrostatic pressure to said hydraulic torque converter including fluid pressure generating means responsive to movement of the vehicle, and means responsive to the difference in the pressure supplied to the hydraulic torque converter and the pressure supplied by said generating means for regulating the actuation of said hydraulically operable controlling means to disengaged condition.

26. In a transmission having forward and reverse driving means, a hydraulically controllable means for actuating each of said driving means to engaged and released conditions, one of said actuating means being biased to maintain its corresponding driving means in engaged condition and being releasable by fluid pressure, and the other of said actuating means being biased to maintain its driving means in released condition and being engageable by fluid pressure, means for simultaneously delivering fluid to both of said actuating means, and means blocking delivery of fluid to one of said actuating means until the pressure of fluid for delivery to the other actuating means has reached a predetermined value.

27. In a transmission system including a hydraulic torque conveyor and planetary gearing, said gearing including an input portion, a reaction portion and an output portion, reaction holding means for preventing unwanted rotation of the reaction portion, a friction clutch engageable to connect the input portion to the reaction portion, means tending to engage said clutch at relatively light holding pressure, and means responsive to movement of the output portion for releasing said clutch.

28. In a transmission system including a hydraulic torque conveyor and planetary gearing, said gearing including an input portion, a reaction portion and an output portion, reaction holding means for preventing unwanted rotation of the reaction portion, a friction clutch engageable to connect the input portion to the reaction portion, means tending to engage said clutch at relatively light holding pressure, and means responsive to movement of the output portion for releasing said clutch, said clutch being hydraulically actuatable and said means tending to engage the clutch including a throttling valve, said means for releasing the clutch including a valve actuating portion for moving said valve to interrupt the throttling thereof.

29. In a transmission system including a hydraulic torque conveyor and planetary gearing, said gearing including an input portion, a reaction portion and an output portion, reaction holding means for preventing unwanted rotation of the reaction portion, a friction clutch engageable to connect the input portion to the reaction portion, means tending to engage said clutch at relatively light holding pressure, and means responsive to movement of the output portion for releasing said clutch, said clutch being hydraulically actuatable and said means tending to engage the clutch including a throttling valve, said means for releasing the clutch including a valve actuating portion for moving said valve to interrupt the throttling thereof, said gearing providing a plurality of forward ratios, said clutch being released at a starting ratio and engaged at a higher speed driving ratio, and a valving portion movable with said throttling valve to open a separate fluid connection to said clutch to permit energization thereof through said separate connection for said higher ratio.

30. In a transmission system including a hydraulic torque conveyor and planetary gearing, said gearing including an input portion, a reaction portion and an output portion, reaction holding means for preventing unwanted rotation of the reaction portion, a friction clutch engageable to connect the input portion to the reaction portion, means tending to engage said clutch at relatively light holding pressure, and means responsive to movement of the output portion for releasing said clutch, said clutch being hydraulically actuatable and said means tending to engage the clutch including a throttling valve, said means for releasing the clutch including a valve actuating servomotor portion for moving said valve to interrupt the throttling thereof, and a pump operable by the output portion and connected to said servomotor portion and forming a part of said means for releasing said clutch.

31. In a transmission construction adapted for installation in an engine-driven vehicle and having a driving element connectible to an engine and a driven element connectible to the driving wheels of the vehicle, said vehicle having a speed controller for the engine, a hydraulic torque converter having an internal fluid system, and additional torque converting means, hydraulically operable means for controlling the action of the last-mentioned torque converting means, said hydraulic torque converter and additional torque converting means being arranged in series with said driving and driven elements, means including fluid pressure generating means responsive to movement of the vehicle for supplying fluid under pressure to said hydraulically operable controlling means to actuate the same, means including a pressure reducing portion for supplying fluid under a lower hydrostatic pressure to the internal fluid system of said hydraulic torque converter from said same generating means, means responsive to movement of said controller for changing the effective pressure derivable from said generating means, and means connecting said controlling means both to said generating means and to the internal fluid system of the torque converter whereby said controlling means is responsive to the difference in the pressure supplied to the hydraulic torque converter and said pressure derived from said generating means.

32. In a transmission having forward driving means and reverse driving means, a hydraulically controllable means for actuating each of said driving means to engaged and released conditions, the actuating means for said forward driving means being biased to engaged condition and releasable by fluid pressure and the actuating means for said reverse driving means being biased to released condition and engageable by fluid pressure, means for simultaneously delivering fluid to both of said actuating means, and means for blocking delivery of fluid to the actuating means for said reverse driving means until the pressure of fluid for delivery to the actuating means for said forward driving means has reached a predetermined value.

33. In an automatic transmission system incorporating torque transmitting components the operation of which depends on the provision and maintenance of hydrostatic pressure, said system being adapted for installation in a vehicle having a driving engine and a throttle control for the engine, means for supplying fluid under pressure for the operation of such components, movable pressure varying means connected to said throttle control and arranged to proportionately urge said pressure varying means in a direction to decrease the effective pressure as the throttle is moved from the open position toward the closed position, and vice-versa, means responsive to movement of the vehicle to urge said pressure varying means in a direction to reduce the pressure output in proportion to increasing speed of the vehicle, and vice-versa, said means for supplying fluid under pressure including a pump operable in conformity with movement of the vehicle, said means responsive to movement of the vehicle being connected to and operable by and in response to variances in the output pressure derived from said pump, and means including a resrtiction portion between said pump and said means responsive to movement of the vehicle, whereby said means is not operative in response to said pump until said pump has attained a predetermined volumetric output.

34. In an automatic transmission system incorporating torque transmitting components the operation of which depends on the provision and maintenance of hydrostatic pressure, said system being adapted for installation in a vehicle having a driving engine and a throttle control for the engine, means for supplying fluid under pressure for the operation of such components, movable pressure varying means connected to said throttle control and arranged to proportionately urge said pressure varying means in a direction to decrease the effective pressure as the throttle is moved from the open position toward the closed position, and vice-versa, means responsive to movement of the vehicle to urge said pressure varying means in a direction to reduce the pressure output in proportion to increasing speed of the vehicle, and vice-versa, said means for supplying fluid under pressure including a pump operable in conformity with movement of the vehicle, said means responsive to movement of the vehicle being connected to and operable by and in response to variances in the output pressure derived from said pump, means including a restriction portion between said pump and said means responsive to movement of the vehicle, whereby said means is not operative in response to said pump until said pump has attained a predetermined volumetric output, and a pressure limiting valve portion directly connected to the output of said pump by a substantially unrestricted connection and adapted to be urged in an open, pressure-limiting direction both by said output delivered through said unrestricted connection and by the aforesaid means responsive to movement of the vehicle.

35. In an automatic transmission system incorporating torque transmitting components the operation of which depends on the provision and maintenance of hydrostatic pressure, said system being adapted for installation in a vehicle having a driving engine and a throttle control for the engine, means for supplying fluid under pressure for the operation of such components, movable pressure varying means connected to said throttle control and arranged to proportionately urge said pressure varying means in a direction to decrease the effective pressure as the throttle is moved from the open position toward the closed position, and vice-versa, means responsive to movement of the vehicle to urge said pressure varying means in a direction to reduce the pressure output in proportion to increasing speed of the vehicle, and vice-versa, said means for supplying fluid under pressure including a pump operable in conformity with movement of the vehicle, said means responsive to movement of the vehicle being connected to and operable by and in response to variances in the output pressure derived from said pump, means including a restriction portion between said pump and said means responsive to movement of the vehicle, whereby said means is not operative in response to said pump until said pump has attained a predetermined volumetric output, and a pressure limiting valve portion directly connected to the output of said pump by a substantially unrestricted connection and adapted to be urged in an open, pressure-limiting direction both by said output delivered through said unrestricted connection and by the aforesaid means responsive to movement of the vehicle, said means for supplying fluid also including a front pump operable concurrently with the engine for supplying hydrostatic pressure when the engine is running and the vehicle is not moving at a predetermined speed, and means including a valve portion operable both by said pressure limiting valve and said means responsive to movement of the vehicle, for dumping the output of said front pump.

36. In an automatic transmission system incorporating torque transmitting components the operation of which depends on the provision and maintenance of hydrostatic pressure, said system being adapted for installation in a vehicle having a driving engine, means for supplying fluid under pressure for the operation of such components, regulating means movable to vary the effective output pressure from said supplying means, and means responsive to movement of the vehicle to urge the regulating means in a direction to reduce the effective output pressure from said supplying means proportionately concurrently with increasing speed of the vehicle, and vice-versa, said means for supplying fluid under pressure including a rear pump operable concurrently with movement of the vehicle, pressure limiting valve means having substantially unrestricted connection to the output of said rear pump and operable by and in response to changes in the output pressure derived from said pump, said means for supplying fluid also including a front pump operable concurrently with the engine and adapted to supply hydrostatic pressure when the engine is running and the vehicle is not moving at a predetermined speed, a dump valve for dumping the output of said front pump connected to and operable by both said pressure limiting valve and said means responsive to movement of the vehicle, means including a restricted bleed orifice portion connected to the output of said first-mentioned pump, and means responsive to opening of said dump valve for closing said bleed orifice portion.

37. In a transmission construction adapted for installation in a vehicle and having a driving element connectible to an engine and a driven element connectible to the driving wheels of the vehicle, fluid-operable means for controlling the torque-transmitting action of the transmission construction, fluid pressure generating means for supplying fluid to said controlling means, and modulating means movable in one direction to increase the effective pressure deliverable to the controlling means from the generating means and movable in another direction to decrease such pressure deliverable to the controlling means, and means responsive to movement of the vehicle to decrease such effective pressure when the vehicle is moving, a speed controller for the engine movable in one direction to increase engine speed and in another direction to decrease engine speed, and means connecting said speed controller to the modulating means and actuatable in a direction to increase such pressure in response to actuation of the controller in a direction to increase the speed of the engine.

References Cited in the file of this patent

UNITED STATES PATENTS

| | | |
|---|---|---|
| 1,673,863 | Brown | June 19, 1928 |
| 1,915,706 | Wilson | June 27, 1933 |
| 1,970,236 | Kluge | Aug. 14, 1934 |
| 1,975,835 | Farkas | Oct. 9, 1934 |
| 2,103,540 | Livermore | Dec. 28, 1937 |
| 2,168,350 | Lapsley | Aug. 8, 1939 |
| 2,204,872 | Thompson | June 18, 1940 |
| 2,221,393 | Carnegie | Nov. 12, 1940 |
| 2,223,716 | Bojesen | Dec. 3, 1940 |
| 2,282,949 | Dolza | May 12, 1942 |
| 2,332,593 | Nutt et al. | Oct. 26, 1943 |
| 2,343,955 | Cotterman | Mar. 14, 1944 |
| 2,416,129 | Swift | Feb. 18, 1947 |
| 2,442,840 | Carnagua | June 8, 1948 |
| 2,449,586 | Carnagua | Sept. 21, 1948 |
| 2,461,218 | Lapsley | Feb. 8, 1949 |
| 2,478,868 | Hasbany | Aug. 9, 1949 |
| 2,478,869 | Hasbany | Aug. 9, 1949 |
| 2,516,203 | Greenlee | July 25, 1950 |
| 2,516,208 | Hasbany | July 25, 1950 |
| 2,528,584 | Farkas | Nov. 7, 1950 |
| 2,529,400 | Lapsley | Nov. 7, 1950 |
| 2,541,391 | Weiss | Feb. 13, 1951 |
| 2,548,208 | Evernden | Apr. 10, 1951 |
| 2,549,125 | Paton | Apr. 17, 1951 |
| 2,551,746 | Iavelli | May 8, 1951 |
| 2,553,126 | Bailey | May 15, 1951 |
| 2,555,702 | Railton | June 5, 1951 |
| 2,559,922 | Alspaugh | July 10, 1951 |
| 2,562,464 | Jandasek | July 31, 1951 |
| 2,575,522 | McFarland | Nov. 20, 1951 |
| 2,576,336 | Farkas | Nov. 27, 1951 |
| 2,578,308 | Iavelli | Dec. 11, 1951 |
| 2,633,035 | Livermore | Mar. 31, 1953 |
| 2,640,373 | Jandasek | June 2, 1953 |
| 2,645,135 | Frank | July 14, 1953 |
| 2,667,085 | Ackerman | Jan. 26, 1954 |
| 2,691,940 | McFarland | Oct. 19, 1954 |
| 2,693,711 | Kelbel | Nov. 9, 1954 |

FOREIGN PATENTS

| | | |
|---|---|---|
| 607,120 | Great Britain | Aug. 26, 1948 |
| 614,340 | France | Dec. 11, 1926 |
| 962,041 | France | May 30, 1950 |

OTHER REFERENCES

Packard Training Book, pp. 21–25, June 27, 1950.
Product Engineering, pp. 94–97, January 1950.

U. S. DEPARTMENT OF COMMERCE
PATENT OFFICE

CERTIFICATE OF CORRECTION

Patent No. 2,815,684

December 10, 1957

Clifton R. Roche

It is hereby certified that error appears in the printed specification of the above numbered patent requiring correction and that the said Letters Patent should read as corrected below.

Column 1, line 65, for "provide is" read -- provide in --; column 2, line 49, for "diagramatic" read -- diagrammatic --; column 11, line 30, before "pump" insert -- front --; column 12, line 51, before "end" insert -- upper --; column 21, line 33, before "line" insert -- to --; column 22, line 27, for "and then" read -- is then --; line 57, for "of the" read -- to the --; column 28, line 42, for "supply" read -- supplying --; column 29, line 30, after "sun" insert -- gear --; column 34, line 63, list of references cited, under "OTHER REFERENCES", for the date "June 27, 1950" read -- June 27, 1949.

Signed and sealed this 18th day of March 1958.

(SEAL)
Attest:
KARL H. AXLINE

Attesting Officer

ROBERT C. WATSON
Commissioner of Patents